(12) United States Patent
Köser et al.

(10) Patent No.: US 12,434,243 B2
(45) Date of Patent: Oct. 7, 2025

(54) PARTICLE CAPTURE SYSTEMS AND METHODS

(71) Applicant: Savran Technologies, Inc., Cambridge, MA (US)

(72) Inventors: Hür Köser, Wallingford, CT (US); Patrick Rivelli, Cambridge, MA (US)

(73) Assignee: Savran Technologies, Inc., Cambridge, MA (US)

(*) Notice: Subject to any disclaimer, the term of this patent is extended or adjusted under 35 U.S.C. 154(b) by 1107 days.

(21) Appl. No.: 17/288,089

(22) PCT Filed: Oct. 25, 2019

(86) PCT No.: PCT/US2019/058138
§ 371 (c)(1),
(2) Date: Apr. 23, 2021

(87) PCT Pub. No.: WO2020/086999
PCT Pub. Date: Apr. 30, 2020

(65) Prior Publication Data
US 2021/0370300 A1     Dec. 2, 2021

Related U.S. Application Data

(60) Provisional application No. 62/750,620, filed on Oct. 25, 2018.

(51) Int. Cl.
*B01L 3/00* (2006.01)
*G01N 33/543* (2006.01)

(52) U.S. Cl.
CPC ..... *B01L 3/502761* (2013.01); *B01L 3/50273* (2013.01); *B01L 3/50857* (2013.01); *G01N 33/54326* (2013.01); *B01L 2200/027* (2013.01); *B01L 2200/0668* (2013.01)

(58) Field of Classification Search
CPC .............. B01L 2400/043; B01L 2400/04
See application file for complete search history.

(56) References Cited

U.S. PATENT DOCUMENTS

| | | | | | |
|---|---|---|---|---|---|
| 5,837,198 | A | * | 11/1998 | Itani | G01N 1/312 422/65 |
| 2005/0079634 | A1 | * | 4/2005 | Wilding | B01L 3/502707 436/514 |
| 2009/0047297 | A1 | | 2/2009 | Kim et al. | |

FOREIGN PATENT DOCUMENTS

JP         2008510974 A       4/2008

OTHER PUBLICATIONS

EP Extended European Search Report in European Appln. No. 19876750.0, dated Feb. 7, 2022, 13 pages.
CN Office Action in Chinese Appln. No. 201980085427.7, dated Jun. 15, 2023, 13 pages (with English summary).
JP Office Action in Japanese Appln. No. 2021547667, mailed on Sep. 5, 2023, 11 pages (with English translation).

* cited by examiner

*Primary Examiner* — Natalia Levkovich
(74) *Attorney, Agent, or Firm* — Fish & Richardson P.C.

(57) ABSTRACT

Automated microfluidic systems and methods are described for purifying, extracting, and optionally analyzing magnetic target entities such as cells, e.g., bound to one or more magnetic beads.

21 Claims, 13 Drawing Sheets

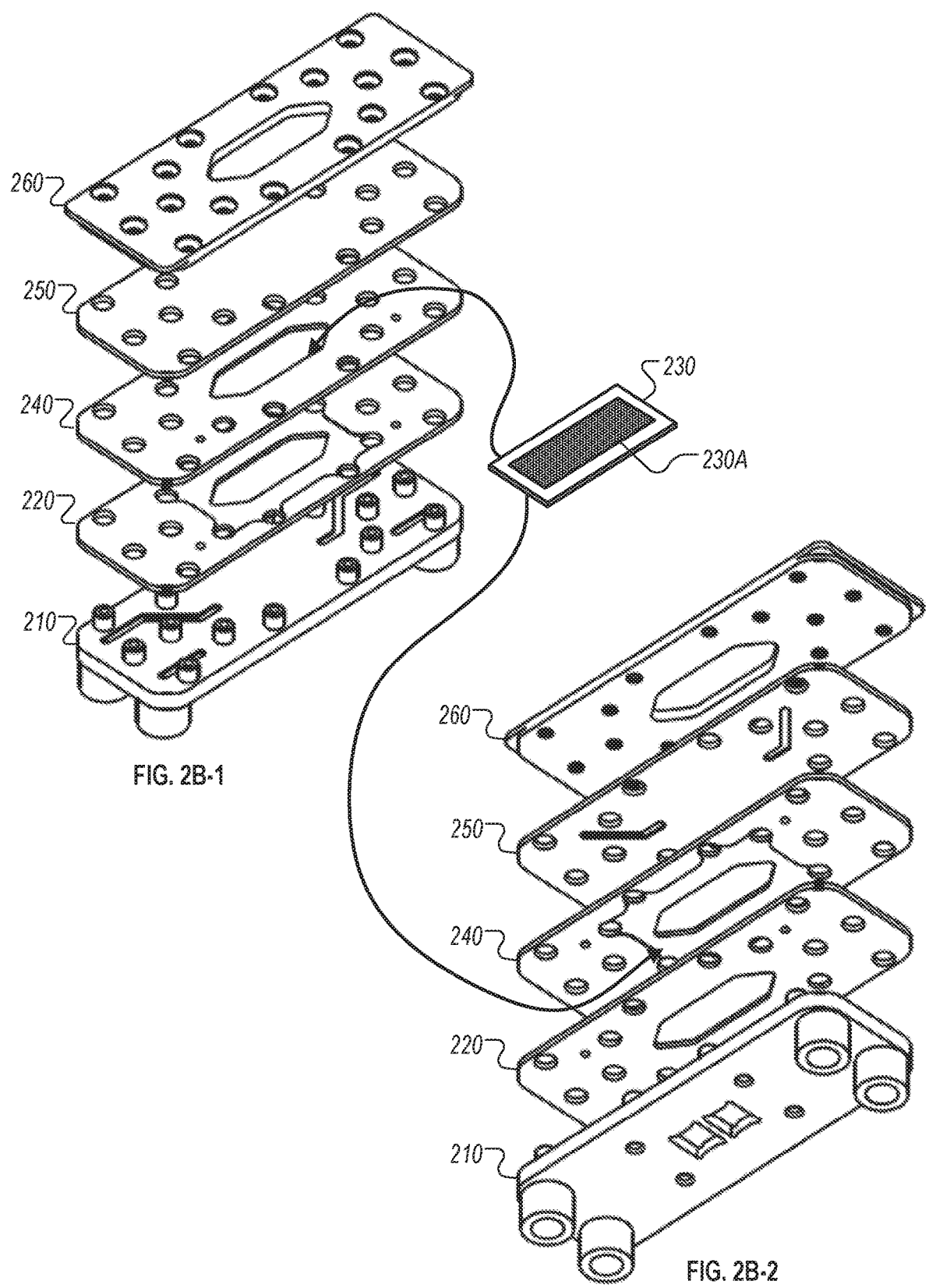

PARTICLE CAPTURE SYSTEMS AND METHODS

CROSS-REFERENCE TO RELATED APPLICATIONS

This application claims priority to U.S. Application Ser. No. 62/750,620, filed on Oct. 25, 2018, which is incorporated herein by reference in its entirety.

FIELD

This specification generally relates to microfluidic systems.

BACKGROUND

Individual particles, such as cells, within a fluid sample can be difficult to analyze within high-throughput microfluidic systems when such cells need to be discriminated from a large numbers of cells that are included in the sample. In addition, individual cells must initially be isolated from the fluid sample to analyze cellular contents such as DNA, RNA, and/or proteins properly, depending on the type of test performed. In some instances, individual cells can also need to be isolated in pre-defined geometric arrangements to enable automated processing and analysis. Common isolation techniques can include diluting a fluid sample in a manner such that only a single cell coincides with a single microwell of a microwell plate. However, such techniques can lack sufficient accuracy and speed, and rely primarily upon statistics, reducing the chances of obtaining repeatable results.

SUMMARY

Innovative aspects described throughout this disclosure include devices, systems, and methods for isolating, capturing, and extracting target entities, e.g., cells, cell clusters, and/or other types of particles, within a fluid sample that is introduced into a disposable microfluidic cartridge. The cartridge can house one or more microfluidic chips that are used to isolate or purify target entities from fluid using immunomagnetic antibody-based surface recognition in a purification chip, e.g., a porous chip as described herein, and then to extract or capture target entities from known locations in an extraction chip, e.g., a microwell chip as described herein. In some embodiments, the systems can process a fluid sample and perform an assay for the target entities with minimal or no human intervention to enhance the ease-of-use and increase the repeatability and accuracy of target entity purification and extraction using the systems as compared to comparable manual assay techniques.

The systems and techniques described herein can be used in scientific and clinical studies of disease conditions where analyzing individual, rare, target entities such as rare cells, e.g., circulating tumor cells in a blood sample or fetal cells (e.g., trophoblasts or nucleated red blood cells) in maternal blood or a maternal cervical mucus sample, is critical to understanding and detecting, for example, a disease such as cancer or a genetic disorder such as fetal aneuploidy.

The methods and systems can also be used to determine cell-to-cell variations. For instance, the systems and techniques can be used to improve studies of cancers that have tumor heterogeneity, which can often require identifying the presence and nature of multiple tumors. As an example, if multiple cells are combined and lysed, then their genetic contents will mix and information pertaining to cell-to-cell variations will be compromised and/or lost. However, if they can be isolated, captured, and analyzed separately using the systems and techniques described herein, information relating to cell-to-cell variations can be retained for analysis. This applies to cells obtained from fluids (e.g., blood, urine, and saliva) and also cells obtained by grinding, e.g., chemically or mechanically, solid tissues, e.g., tumors and distributing the cells in a liquid medium, e.g., a buffer.

In one aspect, the disclosure provides systems for assaying, e.g., purifying, extracting, and optionally analyzing, target entities such as rare cells that are, or are made to be, magnetic, e.g., using functionalized magnetic beads. The systems include a housing that includes a receiving area configured to accept one or more test cartridge devices for capturing target entities when a sample fluid containing target entities is flowed through one or more of the test cartridge devices, wherein each test cartridge device includes one or more microfluidic chips that provide purification, separation, and/or extraction functions; a sample fluid reservoir in fluid communication with the receiving area and configured to store the sample fluid; one or more reagent reservoirs each in communication with the receiving area and configured to store one or more reagents to be used in the assay; one or more magnet components arranged adjacent to the receiving area that holds the test cartridge device and configured to generate a magnetic force sufficient to purify or separate magnetic target entities away from non-magnetic entities and to hold at least one magnetic target entity in at least one known location within at least one of the microfluidic chips when sample fluid flows across a surface within the microfluidic chip; a fluid control device for controlling flow of the sample fluid and the one or more reagents through the fluidic circuit, wherein the fluid control device causes the sample fluid to pass through the one or more microfluidic chips at a flow rate sufficient to move non-magnetic entities out of the one or more microfluidic chips, but not sufficient to remove magnetic target entities from the one or more microfluidic chips; optionally, an analyzer device for imaging the at least one magnetic target entity in at least one known location within the microfluidic chip; and a computing device arranged and programmed to control the analyzer device and the fluid control device.

In these systems, the test cartridge devices can include a purification or separation chip that includes a porous surface and/or an extraction chip that includes a microwell surface having a plurality of microwells arranged in one or more arrays of the microwell surface, wherein the pores of the porous surface are smaller than the target entities (e.g., the pores can have a size of between 0.5 µm and 20 µm, e.g., 5 to 15 µm) and the microwells are larger than the target entities, and wherein the one or more magnet components are arranged to attract and move magnetic target entities toward the porous surface and to hold at least one magnetic target entity on the porous surface when sample fluid flows across the porous surface, and to attract and to hold at least one magnetic target entity in at least one of the plurality of microwells when fluid flows across the microwell surface.

In different implementations, the systems, e.g., the housings, can further include a selector valve for selecting either to flow the fluid sample stored in the sample fluid reservoir into the test cartridge, or to flow the one or more reagent fluids stored in the one or more reagent reservoir into the test cartridge.

These systems can further include a set of magnetic beads configured to bind specifically to the target entities. For example, the magnetic beads can be functionalized to bind specifically to a particular type of cells, e.g., circulating tumor cells or fetal cells, including trophoblasts and nucleated red blood cells. In some implementations, the magnetic beads include on their surfaces one or more binding moieties that specifically bind to a molecule on the surface of the target entities.

In some embodiments, the magnet component is configured and controlled to move along two horizontal axes relative to the microwell surface.

In certain embodiments, the systems further include a target entity extraction module configured to extract target entities from at least one known location, e.g., microwell. For example, the target entity extraction module can include a manual or automated micropipette.

For example, the microwells in the plurality of microwells each can have a size that permits entry of only one target entity into a given microwell, and each microwell in the plurality of microwells has approximately the same size. In some implementations, the one or more arrays of the microwell surface can include a first array of microwells that is arranged at a first location on the microwell surface; and second and subsequent arrays, if present, arranged sequentially on the microwell surface at second and subsequent locations, such that when the sample fluid first flows across the first array of microwells and then sequentially flows across the second and subsequent arrays of microwells, and wherein microwells in the second and subsequent arrays, if present, each have a size, within a given array, that is at least 10 percent larger than the size of the microwells in the previously adjacent array.

In another aspect, the disclosure provides test cartridge devices for purifying and extracting from a liquid sample a target entity that is, or is made to be, magnetic, using magnetic beads. These test cartridge devices include a body having at least one body inlet and at least one body outlet; a first microfluidic component arranged within the body and including a first chamber having a first inlet in fluid communication with the body inlet, and a first outlet; and a plate disposed within the chamber and separating the chamber into a first portion and a second portion, wherein the plate comprises a plurality of pores, wherein each pore is smaller than a target entity and larger than a magnetic bead; a second microfluidic component arranged within the body and including a second chamber having a second inlet and a second outlet, wherein the second chamber includes a microwell surface having a plurality of microwells arranged in one or more arrays of the microwell surface, wherein the microwells are larger than the target entity; and a valve arranged within the body and configured to provide selective fluid communication with the first outlet, the body outlet, and the second inlet; wherein the first and second microfluidic components are arranged in series and the valve is arranged between the first and second chambers, and wherein the valve provides selective fluid communication from the first outlet to either the body outlet or the second inlet.

In some implementations, the microwells in the plurality of microwells each have a size that permits entry of only one target entity into the microwell, and each microwell in the plurality of microwells has approximately the same size.

In another aspect, the disclosure provides methods of capturing target entities, the methods include introducing a fluid sample containing magnetic target entities from a sample fluid reservoir into the test cartridge devices described herein, optionally when housed in the systems described herein. The methods include introducing one or more reagents from a reagent reservoir into the test cartridge device; incubating the sample fluid and the one or more reagents introduced into the test cartridge device; applying to the test cartridge device, e.g., using a magnet component adjustably arranged underneath the microfluidic test cartridge device, a variable magnetic force; causing the sample fluid to pass over the porous plate of the test cartridge at a flow rate sufficient to move non-magnetic entities over and away from a surface of the porous plate, but not sufficient to remove magnetic target entities away from the surface of the porous plate where they are held by the variable magnetic force; and adjusting a position, field strength, or both, of the magnet component relative to the test cartridge device such that the applied magnetic force attracts and holds the magnetic target entities into the plurality of microwells.

In some implementations, the methods further include analyzing, e.g., using a detector component, a property of the magnetic target entities. For example, the property to be analyzed can be quantity, size, sequence, and/or conformation of molecules, DNA, RNA, proteins, small molecules, and enzymes contained inside the target entities, or molecular markers contained on surfaces of target entities, or molecules secreted from target entities. For example, the analyzing can include detecting fluorescence emitted by the target entities.

In certain implementations, the methods can further include after adjusting the position of the magnet component relative to the plurality of microwells, adjusting a lid of the test cartridge device; and extracting a target entity from at least one of the plurality of microwells. For example, extracting a target entity from at least one of the plurality of microwells can include transporting the extracted target entity to a container outside the disposable cartridge.

In some implementations, adjusting the position of the magnet component includes moving the magnet component along two horizontal axes relative to the disposable cartridge. In certain implementations, the variable magnetic force is applied to the test cartridge device while the fluid sample is being flowed into the first microfluidic component of the test cartridge device.

The systems and techniques described herein can provide numerous technical advantages over other existing particle capture systems. For example, many detection systems for circulating tumor cells (CTCs) often have problems, such as insufficient sensitivity, purity, speed, ease-of-use, and efficiency. Some systems may provide acceptable sensitivity, but often require long operation times, e.g., greater than 6-hours, and require multiple pieces of large equipment, which may limit their use in point-of-care or other resource-constrained settings. Some systems may be cost-effective, but may also suffer from lack of sensitivity and are therefore often unable to detect already rare and precious CTCs. The systems and techniques described herein address these and other limitations with the use of other, known microfluidic devices, as discussed below.

The systems include a test cartridge and a reagent cartridge. The test cartridge can house one, two, or more microfluidic chips, such as a purification chip (e.g., porous chip) and/or an extraction chip (e.g., a microwell chip). The porous chip includes two fluidic chambers separated by a porous surface. The porous surface includes pores that are sized to permit entry of magnetic beads in the fluid sample through the porous surface, but prevent entry of the target entities. The microwell chip includes a substrate, e.g., a thin plate, having a surface with one or more arrays of microwells in which the microwells have a size selected to enable a single target entity or a cluster of target entities to enter the microwells. As described herein, these multiple chips are integrated into one disposable cartridge designed for use in the automated systems described herein.

The reagent cartridge, e.g., disposable reagent cartridge, includes multiple reservoirs that store reagents that are used to perform one or more assays carried out by the automated systems. For example, the reagent cartridge can include reservoirs for a magnetic bead solution, antibody solutions, wash buffers, among others. In use in the new automated systems described herein, the test cartridge and the reagent cartridge are fluidly and mechanically connected when inserted into the automated assay system, which includes a fluidic system, a pump (or other fluid pressure or flow sources, e.g., a vacuum source), and a flow control device that controls, for example, the introduction of the fluid sample and other reagents into the test cartridge for performing an assay within fluidic chambers contained in the test cartridge. In some embodiments, the disposable test cartridge and disposable reagent cartridge are integrated into one unit that is designed for use in the systems described herein.

The systems include a magnet component that can be used to apply a flow-independent variable magnetic force to direct and control the movement of target entities that are magnetic or made to be magnetic. For example, the magnet component is used to attract and retain target entities on top of a surface of a porous surface within a first fluidic chamber of the porous chip while unbound magnetic beads in the fluid sample pass through the porous surface into a second fluidic chamber and non-target entities flow through the first fluidic chamber and out of the porous chip. As another example, the magnet component is used to move target entities into the microwells of the microwell chip and/or to hold the target entities in the microwells, without a need to use a wash step to avoid false-positive detection of non-target entities, e.g., cells, which can often lead to unintended loss of specific target entities.

In different embodiments, the magnitude of the magnetic force is modulated to increase or decrease the target entity, e.g., cell, settling rate, and the direction of the applied magnetic field can be adjusted to cause magnetically induced target entity movement along one or two dimensions of the surface of the microwell chip. In this regard, the microwell arrangement of the plate and the application of the variable magnetic field can be used to capture magnetized cells and cell clusters more efficiently with higher accuracy and consistency.

As described herein, the term "magnetic" when referring to target entities means either inherently magnetic, paramagnetic, or superparamagnetic, or made to be magnetic, paramagnetic, or superparamagnetic, by the application of a magnetic or electric force. The term magnetic when referring to target entities also refers to target entities that are, or are made to be, magnetic, paramagnetic, or superparamagnetic by being attached, i.e., linked, e.g., covalently or non-covalently, to a bead or particle that is itself magnetic, paramagnetic, or superparamagnetic.

As described herein, "target entities" or "target particles" within a fluid sample are either inherently magnetic, paramagnetic, or superparamagnetic, or are magnetized (e.g., made magnetic, paramagnetic, or superparamagnetic), at least temporarily, using different techniques, e.g., binding to a magnetic particle, e.g., a magnetic bead, as described herein. The target entities or particles can be cells (e.g., human or animal blood cells, mammalian cells (e.g., human or animal fetal cells, e.g., trophoblasts or nucleated red blood cells in a maternal blood sample, human or animal tumor cells, e.g., circulating tumor cells (CTC), epithelial cells, stems cells, B-cells, T-cells, chimeric antigen receptor T cells, dendritic cells, granulocytes, innate lymphoid cells, senescent cells (and other cells that are related to idiopathic pulmonary fibrosis), megakaryocytes, monocytes/macrophages, myeloid-derived suppressor cells, natural killer cells, platelets, red blood cells, thymocytes, and neural cells), and bacterial cells (e.g., *Streptococcus pneumonia, E. coli, Salmonella, Listeria,* and other bacteria such as those that lead to sepsis including methicillin-resistant *Staphylococcus aureus* (MRSA)).

The target entities or particles can also be plant cells (e.g., cells of pollen grains, leaves, flowers and vegetables, parenchyma cells, collenchyma cells, xylem cells, and plant epidermal cells) or various biomolecules (e.g., DNA, RNA, or peptides), proteins (e.g., antigens and antibodies), or particles, such as contaminants, e.g., toxic particles, in environmental fluids (e.g., sewage or water, such as *Burkholderia pseudomallei, Cryptosporidium parvum, Giardia lamblia,* and parasitic worms and other contaminating organisms and their eggs or cysts). The target entities can also be particles, including contaminating or toxic particles, e.g., in water or fluids for human or animal consumption.

The target entities that are cells can have a minimum diameter between one hundred nanometers to one micron and range up to about 20, 30, or 40 microns or more. The clusters of target entities can be larger and range up to 100 μm or 1 mm in size. Although this disclosure is described in reference to the capture of cells or cell clusters, the systems and methods described herein can also be used to capture or isolate other types of target entities or particles from liquid samples. For example, the target entities can be exosomes or other extracellular vesicles with sizes that can be as small as 30 nanometers or less. The samples can be any bodily fluids from a human or animal subject, such as blood, e.g., whole blood, plasma, serum, urine, saliva, lung lavages, cerebrospinal fluid, breast milk, amniotic fluid, semen, lymph, and mucus and mucosal secretions, e.g., vaginal or cervical, secretions. The samples can also be fecal samples mixed in buffer or other liquids, and bone marrow or other tissue or cell samples, e.g., solid tumor samples cut and macerated, e.g., in water or a buffer.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other potential features and advantages will become apparent from the description, the drawings, and the claims.

BRIEF DESCRIPTION OF THE DRAWINGS

FIGS. 2A-F are schematic diagrams of an example of a microfluidic device, e.g., a test cartridge, that can be used with the system depicted in FIG. 1A. FIG. 2A depicts a fully assembled microfluidic device. FIG. 2B depicts an exploded view of multiple layers of the microfluidic device of FIG. 2A. FIGS. 2C-F depict top views of individual layers of the microfluidic device of FIG. 2A.

FIG. 4A depicts examples of reservoirs of the reagent cartridge. FIG. 4B depicts an embodiment of the reagent cartridge placed on a mating manifold.

In the drawings, like reference numbers represent corresponding parts throughout.

DETAILED DESCRIPTION

In general, devices, systems, and methods are described for isolating, capturing, and extracting target entities, e.g., cells, cell clusters, and/or other types of particles such as exosomes, bacteria, or other biological entities within a fluid sample that is introduced into a disposable microfluidic test cartridge. The cartridge can house one or more microfluidic chips, such as a purification chip that separates the magnetic or magnetized target entities from non-target entities and excess magnetic beads that are not bound to target entities (e.g., a porous chip) and an extraction chip that localizes target entities into specific, known locations from which they can be extracted (e.g., a microwell chip), that together are used to isolate target entities from fluid into microwells using immunomagnetic antibody-based surface recognition and capture target entities.

In one example, the porous chip includes two fluidic chambers separated by a porous surface with pores that are sized to permit entry of magnetic beads in the fluid sample through the porous surface, but prevent entry of some target entities, such as cells, that are larger than the pores, yet allow the entry of other smaller target entities, such as exosomes or specific proteins, e.g., antibodies, that are free or bound to beads. In one example, the microwell chip includes a substrate, e.g., a thin plate, having a surface with one or more arrays of microwells in which the microwells have a size selected to enable a particular size of target entity to enter the microwells. In some embodiments, the microwell chip includes two or more sets of microwells of different sizes, wherein all microwells in a set have the same diameter, but microwells in different sets have different diameters.

In some embodiments, a system as described herein can process a fluid sample and perform an assay for the target entities with minimal or no human intervention to increase the ease-of-use, repeatability, and accuracy of target entity isolation using the methods described herein relative to comparable manual assay techniques.

The systems are also capable of applying a flow-independent variable attractive force to direct and control movement of magnetic, paramagnetic, or superparamagnetic target entities, e.g., cells, of interest without a need to use a wash step to avoid false-positive detection of non-target entities. For instance, the magnitude of the applied flow-independent attractive force can be manipulated to increase or decrease the cell-settling rate, and the direction of the applied magnetic field can be adjusted to cause magnetically-induced cell movement along two dimensions of the plate surface. In this regard, the microwell arrangement on the plate and the application of the variable magnetic field can be used to capture cells and cell clusters with high efficiency, accuracy, and consistency.

System Overview

Figure 1A:
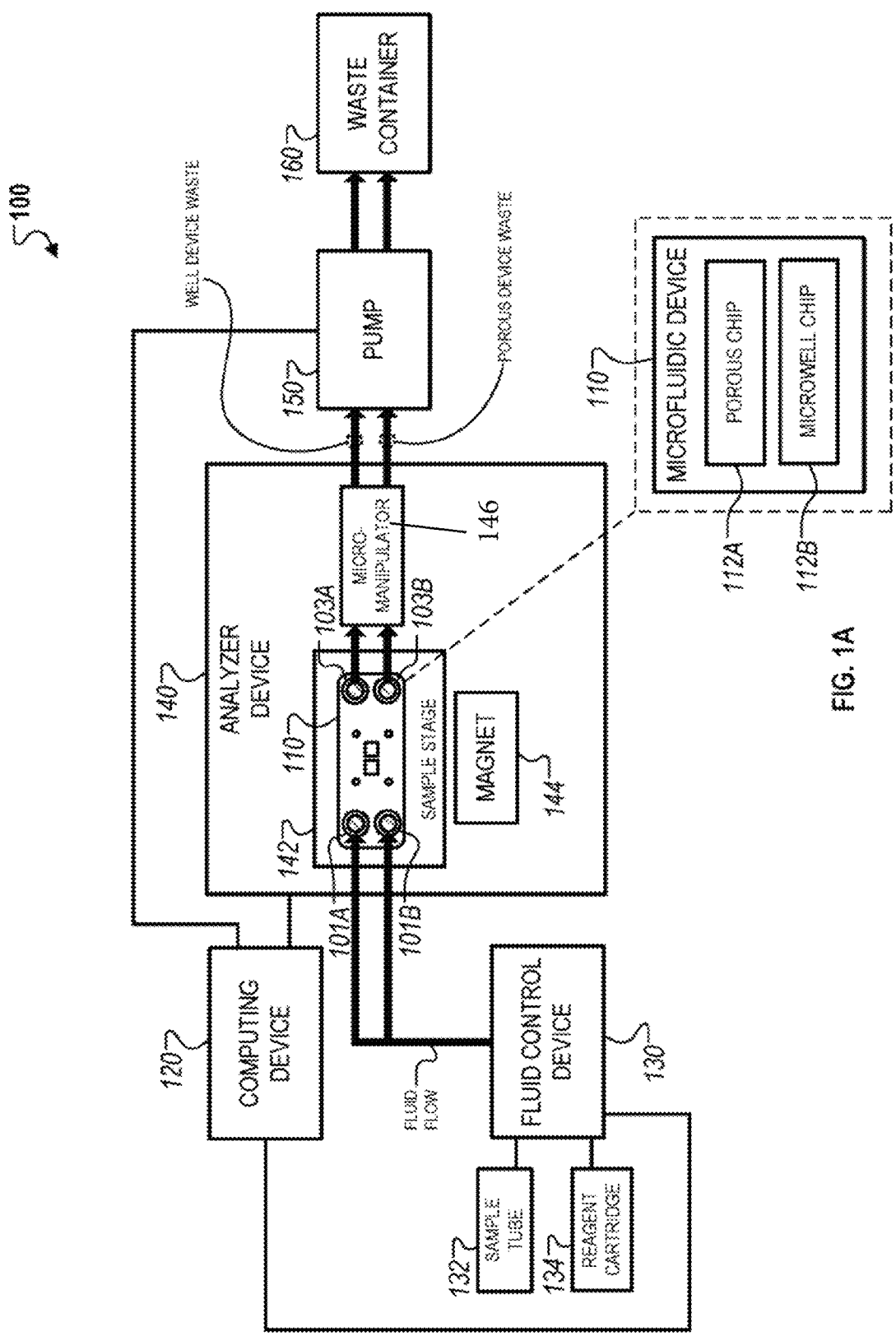
FIG. 1A is a schematic diagram that illustrates an example of a system that can be used with disposable test cartridges for isolating, capturing, and analyzing target entities.

FIG. 1A illustrates an example of a cell analysis system 100. The system 100 generally includes a microfluidic device 110, e.g., a microfluidic test cartridge, a computing device 120, a fluid control device 130, an analyzer device 140, a pump 150, and a waste container 160.

Figure 5:
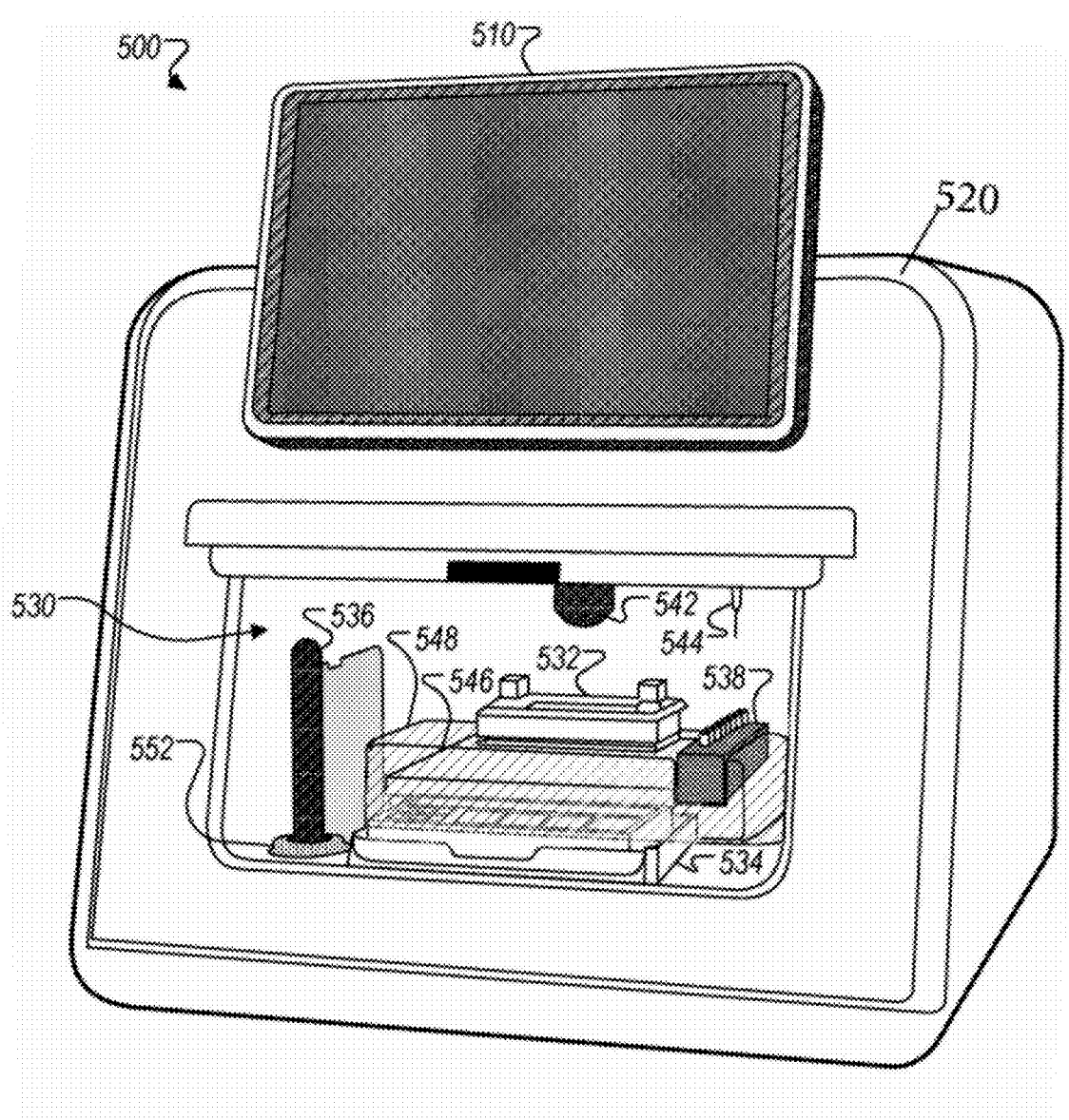
FIG. 5 is a schematic diagram of an example of an embodiment of a fully-automated assay system that can be used with test cartridges as described herein.

In general, the system 100 can be used to isolate target entities from a fluid sample that is introduced into a test cartridge that houses one or more microfluidic chips. Target entities are isolated and captured in the purification chip that includes fluidic chambers using, for example, an immunomagnetic antibody-based surface recognition (of target entity surface ligands, e.g., cell surface receptors) technique on one or more surfaces of the microfluidic chips. In some embodiments, aspects of the system 100 can be operated as a manual assay by a human operator. For example, once target entities have been captured within the extraction chip, a human operator can use a micropipette to extract the captured target entities from specific, known locations within the extraction chip. In other embodiments, for example as shown in FIG. 5, the system 100 is operated as a semi-automated or fully-automated assay that is controlled by the computing device 120 with minimal or no human intervention. For example, a sample fluid can be initially introduced into the sample fluid container, e.g., vacutainer, 132 by a human operator, and other aspects of the assay, e.g., flow control through the microfluidic device 110, movement of the magnet 144, image capture and analysis by the analyzer device 140, and target entity extraction, can be controlled by software that runs on the computing device 120.

In some implementations, the sample fluid container, e.g., reservoir, 132 can be within the housing of the system, or there can be a holder in or on the housing that holds a test tube/vial/vacutainer of sample fluid, e.g., blood, and a tube or fluid conduit that leads from the test tube into the system. In other implementations, a rack in or on the housing holds two or more test tubes/vials. Magnetic beads can be added to the test tubes/vials or the sample fluid can be flowed into one or more reservoirs in the housing, and the magnetic beads are then added to the one or more reservoirs. Alternatively, the magnetic beads can be located within the test tubes/vials/vacutainers before the sample fluid, e.g., blood, is added.

The system 100 is configured to isolate, extract, and optionally analyze target entities within a sample fluid using a microfluidic test cartridge device 110. The target entities are magnetized using magnetic beads, for example, using specific antibody-antigen binding. The magnet(s) 144, e.g., permanent magnet(s) or electromagnet(s), is or are generally situated adjacent to a receiving area, e.g., a stage, 142, arranged opposite to the microfluidic test cartridge device 110 and is or are used to generate an attractive force, e.g., a magnetic field, to attract unbound magnetic beads through the porous surface and to attract and hold the magnetic or "magnetized" target entities to be captured on the surface of the porous surface, as well as to hold target entities in specific locations of the extraction chip, e.g., in microwells of a microwell chip in microfluidic test cartridge device 110 as described herein. The analyzer device 140, when present, is used to detect characteristics associated with the captured target entities.

The "magnetic beads" as described herein for use in the systems and methods described herein can be magnetic, paramagnetic, or superparamagnetic particles that can have any shape, and are not limited to spherical shapes. Such magnetic beads are commercially available or can be specifically designed for use in the methods and systems described herein. For example, Dynabeads® are magnetic or superparamagnetic and come in various diameters (1.05 µm, 2.8 µm, and 4.5 µm). Sigma provides paramagnetic beads (1 µm, 3 µm, 5 µm, and 10 µm average diameter). Pierce provides superparamagnetic beads, e.g., 1 µm in average diameter. Thermo Scientific MagnaBind® Beads are superparamagnetic and come in various diameters (1 µm to 4 µm). Bangs Lab sells magnetic and paramagnetic beads (0.36, 0.4, 0.78, 0.8, 0.87, 0.88, 0.9, 2.9, 3.28, 5.8, and 7.9 µm average diameter). R&D Systems MagCellect® Ferrofluid contains superparamagnetic nanoparticles (150 nanometers in diameter). Bioclone sells magnetic beads (1 µm and 5 µm average diameter). In addition, PerkinElmer provides (Chemagen) superparamagnetic beads (0.5-1 µm and 1-3 µm average diameter). The magnetic beads are particles that can range in average diameter, for example, from 10 nanometers to 100 micrometers.

If a cell is traveling in a fluidic chamber of the microfluidic device 110 under the influence of a substantially horizontal fluidic flow and a downward magnetic force, its contact with the surface depends on a balance between the fluidic drag force and the downward magnetic force, which depends on the magnetic field, as well as on the properties and the number of the beads on the cell surface. The fluidic drag force depends on the average flow velocity, which is represented by the following equation: $Q=V*A$, where Q is the flow rate, V is the average fluid velocity, and A is the cross-sectional area of the flow chamber.

In a study entitled "circulating tumor cell detection using a parallel flow micro-aperture chip system," investigators demonstrated that when a tumor cell is bound to at least 7 superparamagnetic beads from Sigma (with 1 µm average diameter), the cell has a 90% probability in encountering a solid surface if the average fluid velocity is on the order of 4.4 mm/s (i.e., 2 ml/min flow rate with a cross-sectional area of about 7.6 mm$^2$). See *Lab Chip*, 2015, 15, 1677-1688. In the study, the magnet used was a neodymium permanent magnet (K&J Magnetics, grade N52) with 0.4 to 1.5 T of flux density and a gradient of 160 to 320 T/m in the vicinity of the surface of the magnet, which was placed some 650 micrometers below the surface of a chip. Under these conditions, even a cell that has a single magnetic bead can be attracted to the chip surface, albeit with a lower probability.

In some embodiments, the flow rates and velocities can be reduced significantly to maximize the probability of capturing cells. Higher flow rates (ml/min) can result in higher velocities (mm/s), which may introduce risk of cells escaping the surface. Alternatively, higher flow rates can still be used with larger cross-sectional areas so as to prevent the average velocity from increasing. In these embodiments, "cross-sectional area" refers to an area of a fluidic chamber that is measured perpendicular to the fluid flow. Alternatively, stronger magnets or beads with higher magnetic susceptibility (e.g., higher iron-oxide content) can also be used. In some other variations, higher affinity antibodies can be coupled on the beads surface. This will result in a greater number of beads binding to the surface of a cell, and hence a greater overall magnetic force.

In some embodiments, the fluidic flow rate and speed can also be increased without causing cells captured in the microwells to escape from the surface of the microwell chip. For example, in one embodiment, the volumetric flow rate, magnetic field strength, and the cross-sectional area are configured to enable average flow velocities that range from 0.0001 mm/s to 500 mm/s or from 0.01 mm/s to 50 mm/s, or from 1 mm/s to 10 mm/s. In one implementation, the magnetic flux density force on a single magnetic particle can range from 1 picoNewton to 100 picoNewtons, but in some instances, can be as small 1 attoNewton and as large as 100 s of nanoNewtons or microNewtons.

Most magnetic beads typically have an iron oxide core in their center with a polymeric shell. The beads can also come pre-coated with a surface that can be easily functionalized, e.g., a surface coating of streptavidin, biotin, dextran, carboxyl, NHS, or amines.

In various embodiments, magnetic beads are bound or linked to specific antigens expressed on the surfaces of the target entities, e.g., cells within the fluid sample. In these embodiments, the magnetic beads are functionalized in any one or more ways, e.g., new, conventional, or commercially available, ways to include one or more binding moieties or one or more different types of binding moieties, e.g., appropriate monoclonal or polyclonal antibodies including, but not limited to, antibodies against EpCAM, EGFR, Vimentin, HER2, progesterone receptor, estrogen receptor, PSMA, CEA, PD-L1, HLA-G, CD105, CD141, CD71, folate receptor, or with other binding moieties such as aptamers, or short peptides that can bind to the surface of specific target entities, e.g., specific cells, such as CTCs in a blood sample or fetal cells in a maternal blood sample.

Molecules other than antibodies can also be used as capture on beads. Small molecular weight ligands, or aptamers, as well as antibodies can be bound to a functional group (amino, n-hydroxy succinamide (NHS), or biotin depending on the functional group on the magnetic bead to be used) with a linker group, e.g., with a polyethylene glycol (PEG) chain, in between the low molecular weight ligand and the functional group to suppress nonspecific binding of the beads to non-target entities in the sample.

In other instances, magnetic particles are internalized by the target cells by exposing the fluid sample to droplets of magnetic particles, fluid flow of the magnetic particles, or with the use of a magnetophoretic flow to the microwell chip. For example, the target cells can be incubated in a fluid that contains the magnetic, paramagnetic, or superparamagnetic particles, typically nanoparticles having a size of about 1 nm to a micrometer, under conditions and for a time sufficient for the cells to internalize the magnetic particles. In one embodiment, the average diameter of the magnetic particles is several micrometers, as long as the particles are sufficiently smaller than the size of the target cells so that they can be internalized by the cells. In one embodiment, the cells are blood cells or tumor cells with sizes that range from 5 micrometers to 20 micrometers.

In various embodiments, the cells that internalize magnetic particles are white blood cells (WBCs), tumor cells, immune cells, T cells, B cells, or stem cells. In one implementation of this technology, cells are separated from each other in terms the extent of the internalization of the beads. For instance, cells that internalize more magnetic beads can become more "magnetic" and thus are more easily attracted to a chip surface under flow, while other cells that internalize fewer beads would be less magnetic.

As shown in FIG. 1A, the microfluidic device 110 can include one or more chips with surfaces that form microfluidic chambers where the fluid sample flows between an inlet port and an outlet port. For example, the microfluidic device 110 has a purification chip, e.g., a porous chip, 112A (shown in FIG. 1B) that includes a porous surface 118 with pores 118A to form a fluidic chamber 114. As another example, the microfluidic device 110 includes an extraction chip, e.g., microwell chip, 112B (shown in FIG. 1C) with a surface with microwells 122A to form a microfluidic chamber 124. The bottom surface of the microfluidic chamber 124 either includes or contains a plate that includes an array of microwells (also referred to herein as "wells") that is designed to capture individual cells or cell clusters that are suspended in the fluid sample. In some implementations, the pores of the porous surface 118 have cup-like pore openings that can fully or partially house target entities so as to better localize them for subsequent extraction. In such implementations, the purification chip and the extraction chip are integrated into one chip. For example, a porous chip 112A can serve as both a purification chip and extraction chip without use of a separate microwell chip 112B.

The dimensions of the microwells (e.g., diameter, depth, shape, etc.) and the microwell array pattern can be varied based on the target entity, e.g., target cell, to be captured using the microfluidic device 110. For example, the depth of a microwell can be between the nominal diameter of a targeted cell and less than 2 times the nominal diameter of a targeted cell. As an example, a circulating tumor cell's diameter is about 15 micrometers. The depth of the microwell can be between 15 and 30 micrometers. As another example, the size of a bacterium is about 1 micrometer and the depth of a microwell can be between 1 and 10 micrometers. In another embodiment, the depth of the microwell can be equal to or even 5, 10, 20, or 50% less than the nominal diameter of a cell given the possibility that once a cell is inside the microwell and under the influence of a downward magnetic force, its thickness can reduce, while its width can increase. In one embodiment, the bacteria targeted can be rod shaped with lengths that vary between 1 and 7 micrometers.

Figure 1B:
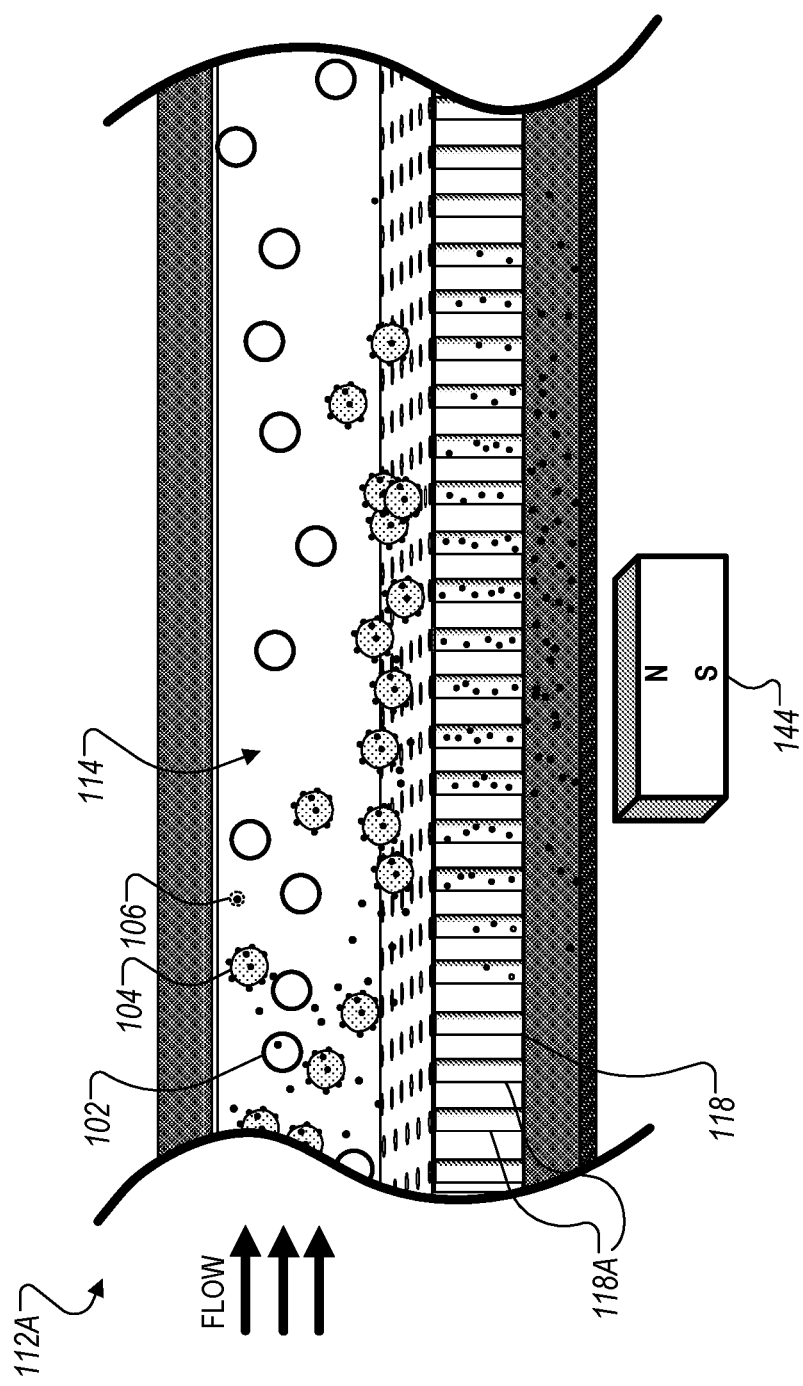
FIG. 1B is a schematic diagram that illustrates an example of flowing a sample fluid through a fluidic chamber of a purification chip, e.g., a porous chip, that can be configured as part of a test cartridge, such as a disposable test cartridge, to remove unbound magnetic beads and non-target entities from the sample fluid.
Figure 1C:
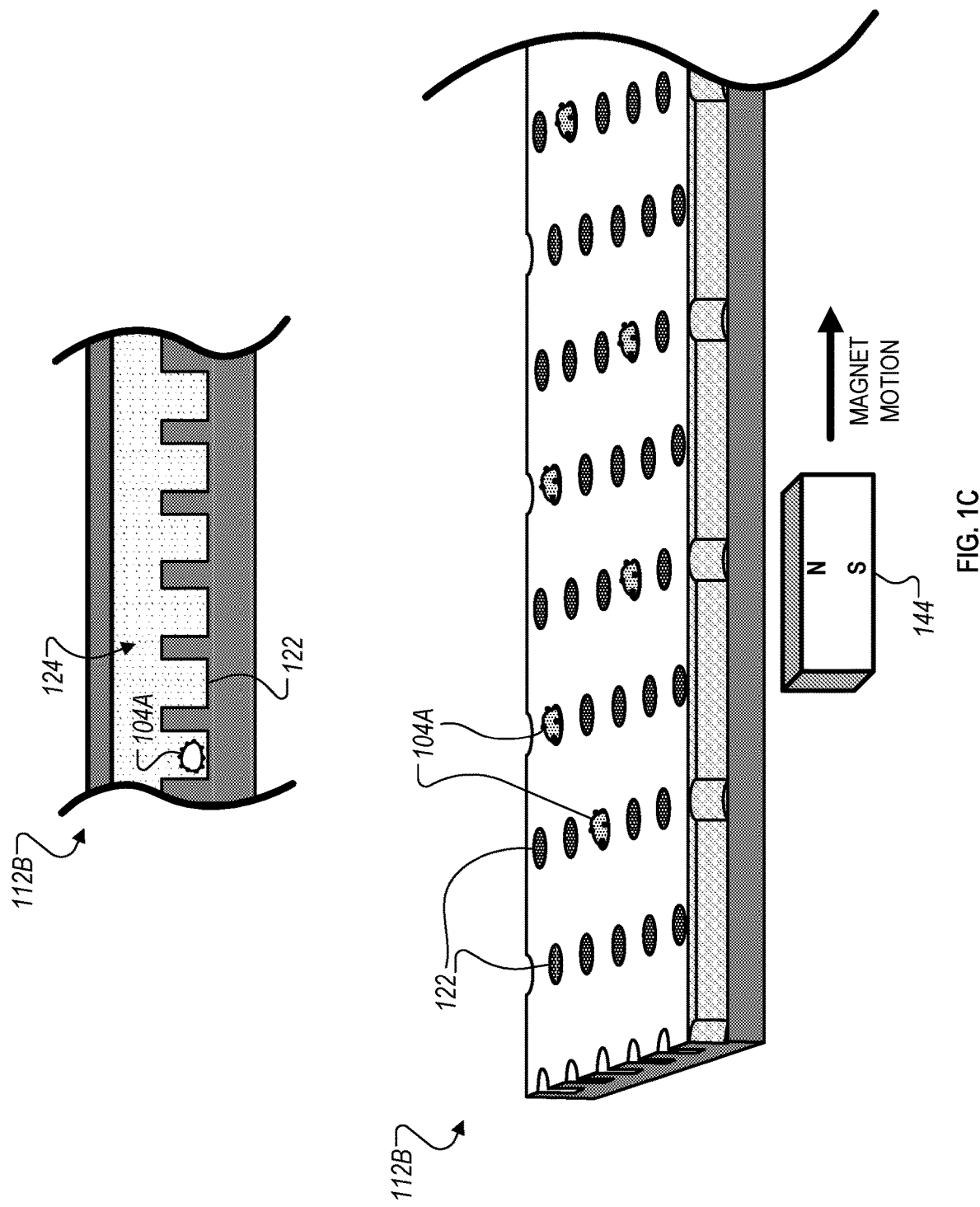
FIG. 1C is a schematic diagram that illustrates an example of the results of flowing a sample fluid with magnetic target entities through a fluidic chamber to deposit at least some of the magnetic target entities into an extraction chip, e.g., in the microwells of a microwell chip, e.g., that can be configured as part of a test cartridge, such as a disposable cartridge.

As shown in FIGS. 1A-C, the microfluidic device 110 can generally include one or more fluidic chambers and houses a porous chip 112A, a microwell chip 112B, or both. Referring initially to FIG. 1B, the porous chip 112A includes a porous surface 118 that include pores 118A that are sized to be smaller than target entities 102, but larger than unbound magnetic beads 106. The porous chip 112A is used to clear out any non-target entities 104, e.g., white blood cells in a whole blood sample, and any unbound magnet beads 106, that are smaller than the target entities 102 and are thus capable of passing through the pores 118A. The magnet 144 is used to apply an attractive force that causes magnetized target entities 102 to remain attracted to the surface of the porous chip 112A as fluid flows along the top of the porous chip 112A and unbound magnetic beads 106 pass through the pores, thereby removing unbound magnetic beads from the sample flowing across the porous chip).

In general, the porous chips can be manufactured of various materials that are sufficiently rigid using various techniques, including laser drilling, milling, anisotropic etching, and chemical etching. One example of a porous chip is depicted in FIG. 1B and described herein. Other examples of porous chips are disclosed in U.S. Pat. No. 9,500,625, titled "MICRO-FLUIDIC SYSTEM USING MICRO-APERTURES FOR HIGH THROUGHPUT DETECTION OF CELLS," the entire contents of which are incorporated herein by reference.

In some embodiments, some of the magnetic beads that pass through the pores are bound to other, secondary target entities, e.g., molecules or exosomes that are small enough to pass through the pores on their own or when attached to the beads. In such embodiments, the primary target entities are captured on the surface of the porous chip, and the secondary target entities are captured in the chamber below the porous chip. This embodiment is useful, for example, to use one device to collect both CTCs, e.g., prostate cancer CTCs, which would be captured on the surface of the porous plate, and a related or corresponding molecule, e.g., Prostate Specific Antigen (PSA) that fits through the pores and would be captured in the chamber below the porous plate. One could use different magnetic beads to attach to the CTCs and the PSA, so both will be magnetic.

Referring now to FIG. 1C, the microwell chip 112B can include an arrangement with multiple arrays of microwells 122A that are used to capture target entities attracted to the bottom of the microwells by an attractive force applied by the magnet 144. Other examples of microwell chips are disclosed in PCT/US2017/029202, titled "HIGH-THROUGHPUT PARTICLE CAPTURE AND ANALYSIS," the entire contents of which are incorporated herein by reference.

In some embodiments, such as the example depicted in FIG. 1A, the microfluidic device 110 has a single housing that houses both the porous chip 112A and the microwell chip 112B. The housing of the microfluidic device 110, in such embodiments, includes a fluidic circuit that connects the porous chip and the microwell chip within the housing such that the porous chip is placed upstream of the microwell chip in the fluidic circuit. In the example depicted in FIG. 1A, the microfluidic device 110 includes two inputs. A top inlet port 101A receives sample fluid from a sample tube 132 and a bottom inlet port 101B receives reagents from a reagent reservoir 134. The microfluidic device 110 also includes two outlets. A top outlet 103A is used to remove waste from the microwell chip, e.g., excess fluid that flows through a fluidic chamber of the microwell chip and does not include captured target entities. A bottom outlet 103B is used to remove waste from the porous chip, e.g., fluid that flows through a fluidic chamber 114 of the porous chip 112A that includes unbound magnetic beads 106 and non-target entities 104 (shown in FIG. 1B). Although this is one example of an arrangement of a fluidic circuit within the microfluidic device 110, other arrangements are contemplated within this disclosure, as described herein.

In some other embodiments, the microfluidic device 110 houses either a single microwell chip or a single porous chip.

In such embodiments, the microfluidic device 110 that houses a microwell chip can be similarly structured as a microfluidic device 110 that houses a porous chip. For example, as depicted in FIG. 2B, each microfluidic device 110 can have similar outer layers and different inner layers and/or chambers that form either a microwell chip plate or a porous plate, or both. In the embodiments where a microfluidic device houses only one internal chip, a microfluidic device housing a porous chip can be connected in series with another microfluidic device housing a microwell chip in a fluidic circuit. For example, the microfluidic device housing the porous chip can be placed upstream in the fluidic circuit so that a volume of the sample fluid containing non-target entities and unbound magnetic beads is flowed to the waste container 160. Then, another volume of the sample fluid containing the target entities can be introduced into the microfluidic device housing the microwells for capturing the target entities. This type of arrangement can be used to improve target entity capture by increasing the concentration of target entities within the fluid that is introduced into a fluidic chamber containing microwells.

As shown in FIG. 1A, the computing device 120 can be used as a controller to automate actions performed on the microfluidic device 110 for various steps of the methods described herein, e.g., sample fluid injection, cell capture, extraction of captured cells, and/or analysis of captured cells. The computing device 120 can be any type of computing device with one or more microprocessors and computer-readable storage media encoded with computer program instructions that cause the computing device 120 to perform operations relating to capturing, isolating, and/or analyzing target entities. As examples, the computing device 120 can be a desktop computing device, a laptop computing device, a tablet-computing device, a smartphone, or any other device capable of running executable code.

The computing device 120 can run software that enables the computing device 120 to operate as a controller for the system 100. The computing device 120 can automate actions performed on the microfluidic device 110 for various steps of the methods described herein, e.g., sample fluid introduction, cell capture, extraction of captured cells, and/or analysis of captured cells. In one example, the computing device 120 can be used to adjust the position of a receiving area, e.g., stage, 142 that adjusts the position of the microfluidic device 110 relative to the field-of-view of the analyzer device 140 to record images of the contents of each microwell, or relative to a micropipette for extraction of captured cells. In another example, the computing device 120 is capable of generating computer-implemented instructions that adjust the location of the magnet 144 and the magnitude of the generated attractive force to customize the cell capture technique for a specific type of sample fluid, target entity, magnetic beads, and/or cartridge The computing device 120 can include one or more microprocessors configured to control the fluid control device 130 to execute a controlled flow protocol for a particular target entity, magnetic bead, recognition element, sample fluid, and/or sample size. Different flow protocols can be used to perform assays with different target entities to be analyzed, different types of fluid samples to be processed, or different volumes of the same sample fluid. The computing device 120 can incorporate a reader to read indicia associated with a particular sample or samples, and automatically upload and execute a predetermined flow protocol associated with the particular sample. The computing device 120 can also modulate the magnetic field during a detection cycle to facilitate capturing the target entities and drawing the unbound magnetic beads through the porous chip and holding the target entities on the surface of the porous chip, and then into the array of microwells.

The computing device 120 can also be configured to allow user-controlled operation. For instance, the flow rate for a particular target cell-magnetic bead combination can be determined by increasing the flow rate of a bound target cell sample until it is no longer possible to attract target entities to the surface of the microfluidic device 110. The continuous operation of the system 100 can be directly observed through a visualization window, e.g., a window placed above the microfluidic device 110, to determine whether additional sample processing is required or whether the detection process is complete. The computing device 120 can also cause the microfluidic device 110 to move to enable the analyzer device 140 to scan and obtain images on various sections of the microfluidic device 110. These images can then be used to reconstruct an image of the entire or a part of the surface of the microfluidic device 110.

The fluid control device 130 can be any type of fluid delivery device used to introduce a sample fluid into a fluidic circuit and cause the sample to flow through the fluidic circuit at one or more selected flow rates. For instance, the fluid control device 130 can be either a peristaltic pump, a syringe pump, a pressure controller with a flow meter, or a pressure controller with a matrix valve. The fluid control device 130 can be connected to tubing that attaches to inlet ports 101A and 101B of the microfluidic device 110 to introduce the sample fluid and/or reagent fluids into fluidic chambers of the microfluidic device 110. In some instances, the fluid control device 130 is also capable of adjusting the flow rate of the sample fluid introduced into the fluidic chamber according to a predetermined program. This predetermined program can be based on a specific sequence that involves flowing the sample fluid that contains cells for a certain period of time at certain speeds and then introducing certain dyes to stain the cells and certain molecules and enzymes to bind to or interact with the cells.

The fluid control device 130 can be placed in different locations of a fluidic circuit associated with the microfluidic device 110. In some embodiments, the fluid control device 130 is located upstream of the microfluidic device 110 (e.g., before the inlet port of the microfluidic device 110 within the fluidic circuit). In such embodiments, the fluid control device 130 can be used to exert a force that "pushes" a volume of fluid from a sample chamber (e.g., a cuvette, test tube, or blood vial) into a chamber containing the microfluidic device 110. In other embodiments, the fluid control device 130 can be located downstream of the microfluidic device 110, e.g., as the pump 150 after the outlet port of the microfluidic device 110 within the fluidic circuit). In such embodiments, the fluid control device 130 can instead be used to exert a force, e.g., a suction or vacuum force that "pulls" fluid from the sample container into the chamber containing the microfluidic device 110. The flow rate applied by the fluid control device 130 in either the downstream or the upstream configuration can range between, for example, 0.1-100 mL/minute, e.g., 0.1-3 mL/minute or 0.1-10 ml/minute.

Figure 4A:
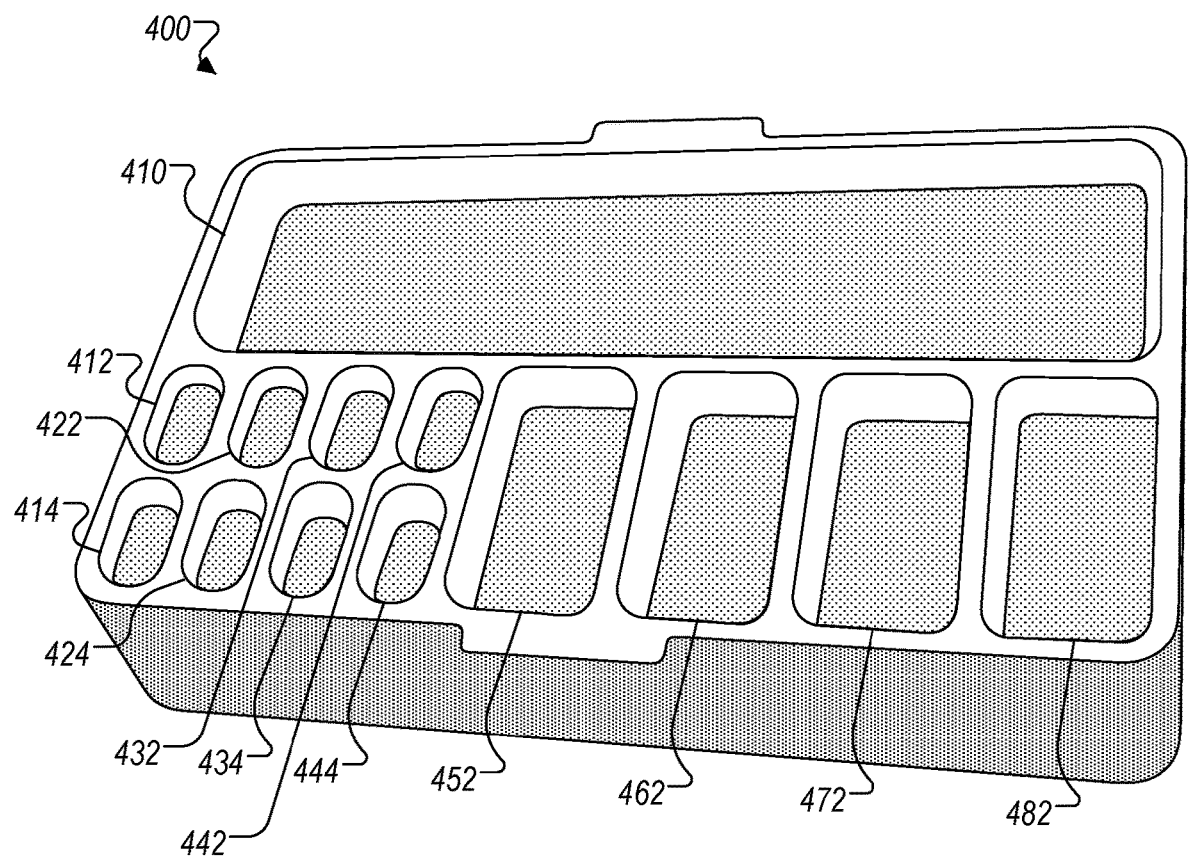
FIGS. 4A-B are schematic diagrams of an example of a reagent cartridge that can be used with the system depicted in FIG. 1A.

As shown in FIG. 1A, the fluid control device 130 is connected to a sample tube 132 and a reagent cartridge 134. The fluid control device 130, as connected to the reagent cartridge, is a valve matrix that controls which reagent will be introduced into the fluidic device, and can introduce chosen reagents into either the top or the bottom inlet of the fluidic device. The sample tube 132 contains a volume of a sample fluid that is introduced into a fluidic circuit of the microfluidic device 110 by the fluid control device 130. The reagent cartridge 134 contains compartments (or "reservoirs") that each store different reagents that are to be used in an immunoassay to capture, isolate, and/or analyze target entities within the microfluidic device 110. One example of the reagent cartridge 134 is depicted in FIG. 4A and described herein.

In some embodiments, the fluid control device 130 can be configured to introduce a sample fluid and assay reagents from the sample tube 132 and the reagent cartridge 134 into the microfluidic test cartridge device 110, respectively, with minimal or no human intervention. For example, the fluid control device 130 can be a software-controlled valve matrix that extracts volumes of the sample fluid and assay reagents automatically from the sample tube 132 and the reagent cartridge 134. In this example, the sample tube 132 is a vacutainer with a stopper that creates a vacuum seal inside the tube to facilitate drawing of a predetermined volume of liquid by the fluid control device 130. The reagent reservoir 134 includes pneumatic valves that allow volumes of reagents to be introduced into the microfluidic test cartridge device 110. In such embodiments, the fluid control device 130 operates as a multi-channel pump that performs assay steps based on control signals received from the computing device 120 and without requiring a human operator to perform the steps.

In some embodiments, the sample tubes 132 are commercially available blood collection tubes. The fluid sample, in such embodiments, is a blood solution, e.g., mixed with chemicals, e.g., anticoagulants, fixatives, and buffers. For example, the sample tube 132 can be a blood collection tube manufactured by Streck, Norgen, or LBGard (Biomatrica). The blood collection tube can vary based on how long they are used to preserve cells and how well they preserve them. The sample tube 132 can be stored at room temperature or near 4° C. to ensure maximum recovery of target entities.

The magnet 144 is generally situated opposite, e.g., underneath in some embodiments, the microfluidic device 110 and arranged to attract magnetic beads toward and through the pores of the porous chip. The magnet(s) is calibrated relative to the average number of magnetic beads linked to each of the target entities to exert a magnetic force sufficient to pull the target entities towards surfaces of the microfluidic device 110. In some embodiments, the magnet(s) can be situated on a side of the microfluidic device or on top, with magnetic force adjusted to accommodate for gravity. In general, the magnet(s) are situated on a side opposite the flow chamber, with the porous chip arranged between the flow chamber and the magnet(s).

The magnetic force retains the target entities at the pores of the porous chip 112A and then within microwells of the microwell chip 112B once the target entities have passed through the entrances of the microwells. The magnetic force is also sufficiently strong to pull the target entities out of the fluid flow through the microfluidic chambers 114 and 124 that tend to pull the target entities in a flow path parallel to the surface of the porous chip 112A in the microfluidic device 110. As an example, the magnet 144 can be an NdFeB Cube Magnet (about 5×5×5 mm) with a measured surface flux density and computed gradient of 0.4 T to 2 T and 100 to 400 T/m (depending on the exact location of the measurement), respectively. In other examples, other magnets including, but not limited to, larger or smaller permanent magnets made of various materials, and electromagnets that are commercially available or manufactured using standard or microfabrication procedures and that are capable of generating time-varying magnetic fields, can also be used.

The magnetic flux density can range from 0.01 T to 50 T or more narrowly from 0.1 to 5 T. The magnetic flux density gradients can range from 0.01 to 1000 T/m, for example, 0.1-1000 T/m, 10 to 750 T/m, 100 to 500 T/m, and 200 to 300 T/m, respectively.

The magnet 144 can have different shapes and dimensions based on a particular application. For example, the shape of the magnet 144 can be, but is not limited to, a cubic shape, rectangular prism-like shape, a ring shape, a circular or elliptical shape, or a combination thereof. In addition, multiple magnets can be used. The size of the magnet 144 can vary such that its minimum dimension can be between 0.1-30 cm. In some embodiments, the magnet 144 is a ring-shaped magnet that is used to cause and/or help dispersal of aggregates of magnetic particles or magnetized target entities. For example, a ring-shaped magnet can be placed around an aggregate of target entities to help disperse individual target entities towards a perimeter of the magnet 144.

The magnet 144 can be housed within a cavity formed in the bottom half of a housing that includes the microfluidic device 110 or can be attached to an outer surface of the housing without the need for a cavity. The magnet 144 can be affixed to or supported relative to the outside of the microfluidic device 110 provided that it is oriented or positioned in a manner to attract the target entities toward the surface of the microfluidic device 110, and to adjust the movement of cells on the surface of the chamber in a controlled manner. For instance, the magnet 144 can be used to guide cells on the surface along a path defined by the movement of the magnet 144 underneath the microfluidic device 110. In other embodiments, the magnet or magnets can be secured within a receiving chamber in a system into which a microfluidic device as described herein, e.g., in the form of a cartridge or cuvette, can be inserted. Such systems can also include the required pumps, controllers (e.g., computers or microprocessors), fluid conduits, reservoirs for fluids to be passed through the microfluidic devices, and analysis systems and equipment as described herein.

Movement of the magnet 144 can be accomplished manually, by a motor, and/or can be provided with a controller that allows selection of a particular sweep pattern for the magnet. The magnet 144 can be electromagnets that can be activated or deactivated as desired. Moreover, the electromagnets can be configured to reverse polarities as part of a technique for controlling movement of the magnetic beads and ligand-bound entities. In addition, the orientation of the magnet 144 can be changed selectively to control the magnitude and direction of the attractive force applied.

In some embodiments, multiple magnets, e.g., electromagnets, can be used and controlled, for example, in tandem or in sequence, to generate magnetic fields that vary with respect to time and space. For example, two or more electromagnets situated in the vicinity (e.g. below) the microfluidic device 110 can be controlled to generate a moving magnetic force that is used to move magnetic entities along the surface of the microfluidic device 110. The magnet movement and force of the magnetic fields are controlled by computing device 120.

The magnitude of the attractive force applied by the magnet 144 is adjusted based on the magnetic properties of the particles attached to the target entities, e.g., cells, the strength of the magnet 144, and/or the placement of the magnet 144 relative to the microfluidic device 110. For example, the magnet 144 can be associated with an external body so that the distance of the magnet from the microfluidic device 110 can be varied thereby to vary the magnetic force applied to the target entities in the microfluidic chamber. The magnetic force applied can then be calibrated to a particular type of target entity or a particular type of functionalized magnetic beads used. In addition, the magnet 144 can be moved to remove the magnetic force entirely according to a protocol for the system 100. Removal of the magnetic force can be used to facilitate removal of the captured target entities from the surface of the porous chip and/or from within the microwells so that the target entities can then be transported or flushed to a separate collection vessel. In one embodiment, the magnet 144, or another magnet, can be placed on top of the chip to help extract the cells out of the microwells. The magnet 144 that is placed on the top can then be moved sideways for sequential extraction of cells in microwell arrays.

In some embodiments, the magnet 144 includes an array of electromagnets placed underneath the microfluidic device 110 in a manner that covers a portion of the microfluidic device 110. One or more electromagnets within the array can then be selectively powered in certain sequences to apply attractive forces to cause motion of the cells along specified pathways along the surface of the microfluidic device 110.

In some embodiments, the attractive force applied by the magnet 144 can be used to direct movement of magnetic, paramagnetic, or superparamagnetic cells of interest without a need to use a wash step to avoid false-positive detection of non-specific cells. For instance, the magnitude of the applied attractive force can be manipulated to increase or decrease the cell-settling rate, and the direction of the applied magnetic field can be adjusted to cause magnetically induced cell movement along two dimensions of the plate surface. In this regard, the microwell arrangement on the plate and the application of the variable magnetic field can be used to capture cells and cell clusters efficiently with high accuracy and consistency.

The analyzer device 140, when present, can be configured to use optical techniques to analyze the cells that are captured within the microfluidic test cartridge device 110. For instance, the analyzer device 140 can be configured to use various microscopic techniques based on fluorescence, bright field, dark field, Nomarski, mass spectroscopy, Raman spectroscopy, surface plasmon resonance, among other known techniques.

The analyzer device 140 can include a CCD camera and a computerized image acquisition and analysis system. The CCD camera can be large enough to cover the size of the entire area of the microfluidic device 110 in a manner to acquire images from all pores of the porous chip 112A and/or from all microwells in the microfluidic device 110. Alternatively, the CCD camera can analyze a smaller field of view that contains only one target entity trapped in a pore and/or one microwell or a group of microwells. In such embodiments, the CCD camera or the microfluidic device 110 can be moved manually or using a stage 142 or other computer controlled modalities to sequentially align the CCD camera with other pores and/or microwells and acquire their images.

The analyzer device 140 can be used to analyze various aspects of the cell capture process using the microfluidic device 110. For example, the analyzer device 140 can be used to analyze cells that have been extracted from microwells of the microfluidic device 110. Alternatively, the analyzer device 140 can be used additionally or alternatively to visualize and/or confirm cell capture within pores of the porous chip 112A and/or microwells of the microfluidic device 110 prior to cell extraction.

The collection device 146 can be used to extract target entities that have been captured in the extraction chip of the microfluidic device 110 using the techniques described herein. For example, the collection device 146 can be one or more micropipettes that enable the extraction of a target entity that resides at a specific, known location in the extraction chip, e.g., within a well-shaped pore of the porous chip or a microwell on the surface of the microwell chip. In some instances, the micropipette is operated by a human operator to extract captured target entities. In other instances, the system 100 includes a micromanipulator that physically interacts with the one or more micropipettes to allow precision movement of the micropipette(s) for extracting target entities captured in the microfluidic device 110. For example, the micromanipulator can be a vertical miniature linear actuator that allows the micropipette(s) to be lowered to a precise height above the microfluidic device 110 for target entity extraction. The micropipette can also be connected to a piston pump to provide the ability to push and pull target entities through the tip of the micropipette(s) during extraction.

Sample Processing Techniques

As described herein, the system 100 can be operated as a partially manual, a semi-automatic, or a fully automated assay system to isolate, capture, analyze, and/or extract target entities from a fluid sample. In one example, the system 100 can be used to process rare cells such as fetal cells in maternal blood or cervical mucus, or circulating tumor cells (CTCs) from a blood sample of a mammal or human, e.g., person diagnosed with cancer or at potential risk for having cancer, e.g., a cancer patient, e.g., a lung cancer patient, for downstream genetic analysis. Sample processing is performed using microfluidic devices using techniques described throughout this disclosure.

In a typical operation, target entities are functionalized with magnetic beads using, for example, immunomagnetic recognition of surface antigens of the target entities. The sample with magnetized target entities is then processed by initially flowing a volume of the sample fluid through a purification chip, e.g., a porous chip, to remove unbound magnetic beads and non-target entities (shown in FIG. 1B). A volume of the sample fluid that exits the purification chip and includes functionalized target entities is then introduced into an extraction chip, such as a microwell chip, for isolating and capturing target entities in specific, known locations, e.g., microwells of the microwell chip (shown in FIG. 1C).

Referring initially to FIG. 1B, a schematic diagram that illustrates an example of flowing a sample fluid through a porous chip 112A is depicted. The porous chip 112A includes fluidic chambers 114 and 116 that are separated by a porous surface 118. The porous surface 118 includes pores 118A that are smaller in diameter than target entities 102 and potentially some non-target entities 104, but larger than magnetic beads and certain non-target entities. This allows unbound magnetic beads in the fluid flowing through the fluidic chamber 114 to pass through the pores 118A and enter the fluidic chamber 116, while preventing entry by the target entities 102 and non-target entities 104.

The magnet 144 is situated nearby the porous chip 112A, e.g., arranged underneath a stage on which the porous chip 112A is arranged. The magnet 144 is used to apply an attractive force that causes unbound magnetic beads in the fluid sample to enter the pores 118A as the fluid sample flows through the fluidic chamber 114 above the porous chip 112A. This attractive force also causes the target entities 102 to be bound temporarily to the surface of the porous surface 118 while the non-target entities 104, which are either not bound to any magnetic beads or are bound to too few of them are not impacted by the attractive force, follow fluid flow through the fluidic chamber 114. In this respect, flowing a fluid sample through the porous chip can be used to remove unbounded magnetic beads and non-target entities, and thereby improve subsequent target entity isolation and capture using the microwell chip.

Once non-target entities and unbound magnetic beads are washed out from the fluidic chamber 114, the attractive force applied by the magnet 144 can be reduced or stopped to permit a volume of the sample fluid that predominantly includes the target entities to exit the fluidic chamber 114. This volume can be introduced into the microwell chip for isolation and capture of the target entities. The volume introduced into the microwell chip excludes waste, i.e., fluid having non-target entities and unbound magnetic beads, and can be exposed to the microwell chip using a buffer flow.

In certain embodiments, the target entities are cells with a dimeter of approximately 7-20 µm within an 8 mL blood sample. In such embodiments, the magnetic beads can have an approximate one micron diameter. The pores 118A can be sized to have approximately a 5 µm diameter, which permits entry of unbound magnetic beads through the pores 118A, but prevents entry of the target entities. This allows the porous chip 112A to be used to clear out unbound magnetic beads from the blood sample without discriminating between different types of cells, e.g., target and non-target cells. The blood sample can be flowed through the fluidic chamber 114 at a sufficiently high flow rate between 0.1-10 mL/min, e.g., 1-5 mL/min, 2-4 mL/min, to allow non-target entities, e.g., white blood cells, which are not bound to any magnetic beads, to be washed out of the fluidic chamber 114. The fluidic chamber 114 can have relatively large dimensions between 5-100 mm, e.g., 0.1-5 mm in height and 5-100 mm, e.g., 5-50 mm, in length, to sustain such flow rates without an increase in linear velocity, which prevents build-up of excessive shear or pressure that might otherwise damage the cells or the integrity of the chamber. Due to the size of the pores 118A, the blood sample only flows through the fluidic chamber 114. However, the fluid chamber 116 can also be fluidically and independently accessible, e.g., for purposes of bubble-free priming with a buffer.

Referring now to FIG. 1C, a schematic diagram that illustrates capture of magnetized target entities 104A within microwells 122A of a microwell chip 112B is depicted. The microwell chip 112B includes a substrate 122, e.g., a thin plate, having a surface with one or more arrays of microwells 122A. Each microwell has a size selected to enable a particular size of target entity to enter the microwell. In one embodiment shown in FIG. 1C, all of the microwells are in one array and all have approximately the same size, e.g., within plus or minus five percent of a selected size.

In some other embodiments, the microwell chip can have two or more arrays of microwells in which the microwells in a given array are all approximately the same size, but the microwells in one array have a different size from the microwells in another array. For example, the microwell chip 112B can have two arrays of microwells in which a first array of smaller microwells is located on the surface of the substrate near a first end of the surface, e.g., closer to an inlet port of a microfluidic chamber, to capture individual cells, and a second array that includes relatively larger microwells is located on the surface closer to a second end, e.g., "downstream" of the first array and closer to an outlet port of a microfluidic chamber, to capture larger cells or cell clusters that do not fit into the upstream smaller microwells.

In some embodiments, the substrate 122 can be a free surface or a surface that is blocked with a non-fouling agent such as bovine serum albumin (BSA), polyethylene glycol (PEG), zwitterionic materials, or other materials that block non-specific binding. In such implementations, an attractive force can be applied by the magnet 144 underneath the substrate 122 to inhibit cell movement.

The magnet 144 is situated nearby the microwell chip 112B, e.g., placed underneath a stage on which the microwell chip 112B is placed (or a chamber into which the cartridge is inserted, e.g., by sliding into place). The magnet 144 is used to apply a flow-independent variable magnetic force to direct and control movement of the target entities within a fluidic chamber above the microwells 122A. For example, the magnet 144 is used to move the target entities 102 and/or to hold captured target entities 102A in the microwells 122A, without a need to use a wash step to avoid false-positive detection of non-target entities that often lead to unintended loss of the target entities.

In certain embodiments, the magnet 144 is moved laterally in a direction parallel to the surface of the microwell chip, e.g., from the inlet port to the outlet port, to allow target entities 102 to be captured in the microwells 122A. For example, the magnetic force causes the target entities 102 to move toward the surface of the microwell chip 112B and drags the target entities horizontally along the surface of the microwell chip 112B until they "click-fall" into individual microwells 122A. This "magnetic dragging" technique can be used to permit target entity capture without requiring microscopic observation. Once captured, the captured target entities can be accessed for extraction or analyzed for imaging and characterization using an analyzer device. In some embodiments, coordinates of individual microwells 122A along the surface of the microwell chip 112B are known to enable repeatable yet automated extraction of captured target entities 102A from the microwells.

Figure 2A:
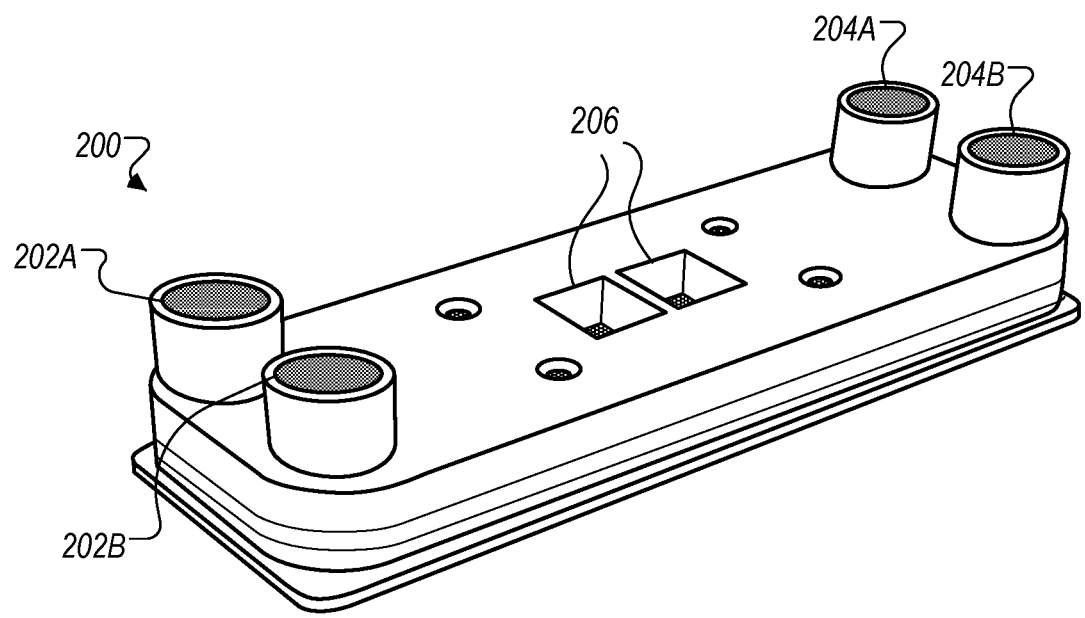

Microfluidic Test Cartridge Devices for Target Entity Purification and Extraction FIGS. 2A-B are schematic diagrams of an example of a microfluidic test cartridge device 200 that can be used with the system depicted in FIG. 1A. Referring initially to FIG. 2A, a microfluidic device 200 that can be used for target entity purification is depicted. In this embodiment, the microfluidic device 200 houses a porous chip, but it can alternatively house either or both of a purification chip and an extraction chip, as described herein in reference to FIGS. 1B and 1C, and FIG. 3. In various embodiments, a microfluidic device can house one or more of each of a porous chip and a microwell chip, or multiples of each or both, e.g., in series or in parallel. For example, a porous chip in series with a microwell chip can be arranged in parallel with one or more pairs of porous and microwell chips. Alternatively, two or more porous chips can be arranged in series, followed by two or more microwell chips arranged in series or in parallel, depending on what cells are to be captured and how they are to be analyzed.

The microfluidic device 200 includes inlet ports 202A and 202B through which fluids are introduced into fluidic circuits within the housing of the microfluidic device 200. Fluid exits the microfluidic device 200 through outlet ports 204A and 204B. The microfluidic device 200 also includes grooves 206 where magnets can be placed to apply an attractive force for isolating and capturing magnetized target entities as described herein.

FIG. 2B schematically depicts individual layers of the microfluidic device 200. FIG. 2B-1 includes perspective views of one side of the individual layers of the microfluidic device 200 and FIG. 2B-2 includes perspective views of the other side of the individual layers of the microfluidic device 200. The microfluidic device 200 includes a top cover 210, a bottom cover 260, and intermediate layers 220, 230, 240, and 250. The intermediate layer 230 includes a porous surface 230A that includes pores sized to be smaller than target entities within a sample fluid but larger than unbound magnetic beads within the sample fluid. For example, the porous surface 230A can have an arrangement of pores similar to those of the porous surface 118 discussed above and depicted in FIG. 1B. Note that not all screw holes are shown in the various layers.

In certain embodiments, the top cover 210 and the bottom cover are made of aluminum and the intermediate layers 220, 230, 240, and 250 are made of silicone, polycarbonate, or a similar transparent, chemically resistant plastic layer, although other suitable materials may also be used. Alternatively, the bottom and/or top covers can be made of transparent materials, such as glass or plastic, to enable viewing of target entities within the device.

Figure 2C:
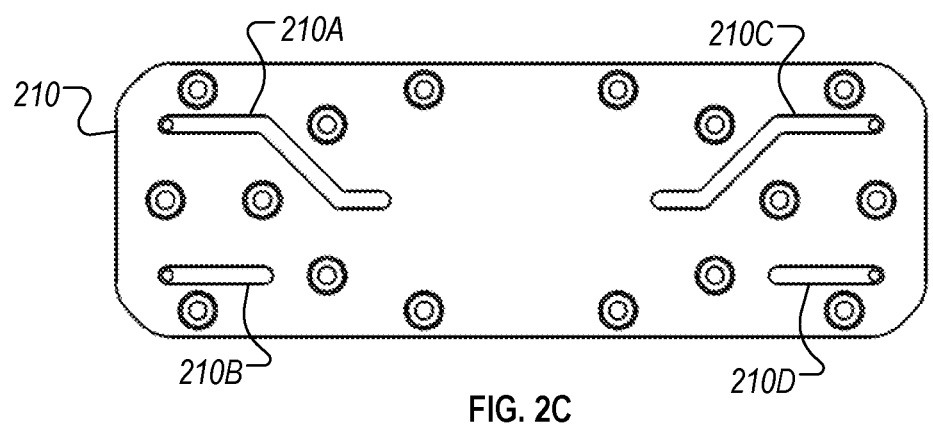

In some implementations, layers 220 and 240 are made of a soft elastomer, e.g., as silicone or a fluorosilicone, that, together, act as gaskets sealing the porous chip 112A and/or the microwell chip 112B in the middle. In such implementations, the layers 220 and 240 form the sidewalls of the top and bottom flow chambers, as well as any through-hole connections between the fluidic channels on layer 210 and 250. FIG. 2C is a lateral view of the top cover 210 of the microfluidic device 200. The surface of the top cover 210 shown in FIG. 2C includes channels 210A and 210B that receive fluid, e.g., a sample fluid, introduced into the microfluidic device 200 through the inlet port 202A and inlet port 202B, respectively (shown in FIG. 2A). The surface of the top cover 210 also includes channels 210C and 210D that receive fluid that exits from a fluidic chamber formed by intermediate layers 220, 240, and 250 and separated by a porous surface 230 (shown in FIG. 2B-1). Fluid leaves the channels 210C and 210D through the outlets 204A and 204B, respectively.

Figure 2D:
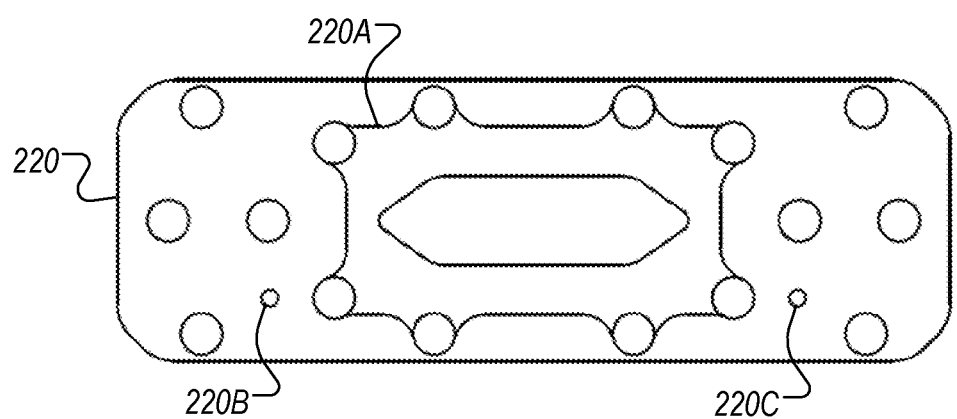

FIG. 2D is a lateral view of the intermediate layer 220 of the microfluidic device 200. The surface of the intermediate layer 220 shown in FIG. 2D includes a chamber 220A that receives fluid that flows through the fluidic circuit of the microfluidic device 200 and exits the channel 210A. The surface of the intermediate layer 220 also includes a recess 220B that receives fluid that exits the channel 210B and a recess 220C that directs fluid into the channel 210D, e.g., after leaving the chamber of the microfluidic device 200.

Figure 2E:
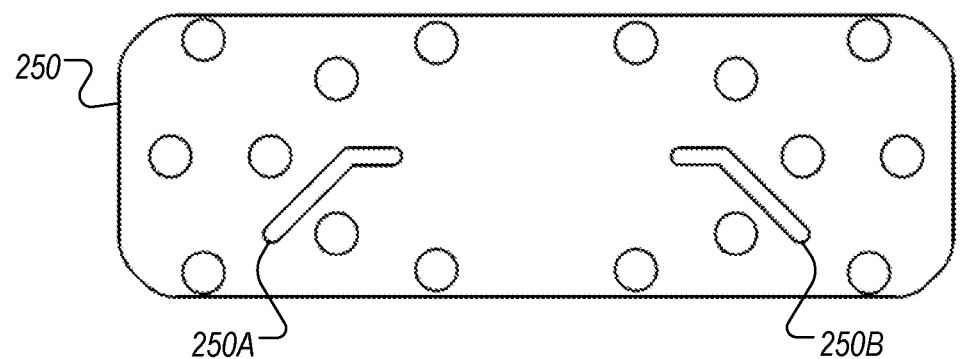
Figure 2F:
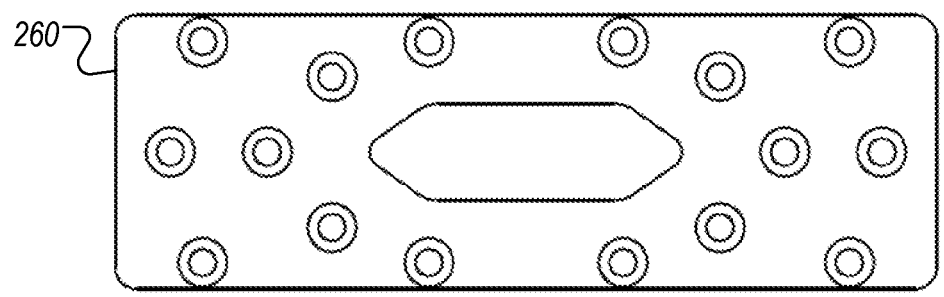

FIG. 2E is a lateral view of the intermediate layer 250 of the microfluidic device 200. The surface of the intermediate layer 250 shown in FIG. 2E includes a channel 250A that receives fluid that flows through the recess 220B. The surface of the intermediate layer 250 also includes a channel 250B that directs fluid to the recess 220C. FIG. 2F is a lateral view of the bottom cover 260 of the microfluidic device 200.

As shown in FIG. 2B-1, when the microfluidic device 200 is fully assembled, the intermediate layer 220 is placed above the intermediate layer 230 within the layer arrangement of the microfluidic device 200 so that a space defined by the chamber 220A forms a top portion of a fluid chamber that is separated by the porous surface 230A. The spaced defined by the chamber 220A can be region of the fluidic circuit of the microfluidic device 200 where a sample fluid is processed so that unbound magnetic beads and non-target entities are removed from the microfluidic device through the porous surface 230A, as discussed above in reference to FIG. 1B.

Both chips can be made out of micro-machined silicon and housed in fluidic chambers machined out of aluminum and plastic and sealed using silicone. In some implementations, two of these chambers are used in an assay: one for a porous chip, the other for a microwell chip. In the case of the latter, the top cover (the bottom in the picture) is opened up to extract cells with micropipette. Since cells are held down in the microwells by a magnetic force, this operation is achieved easily without disrupting the locations of the cells.

Integrated Microfluidic Test Cartridge Devices

Figure 3:
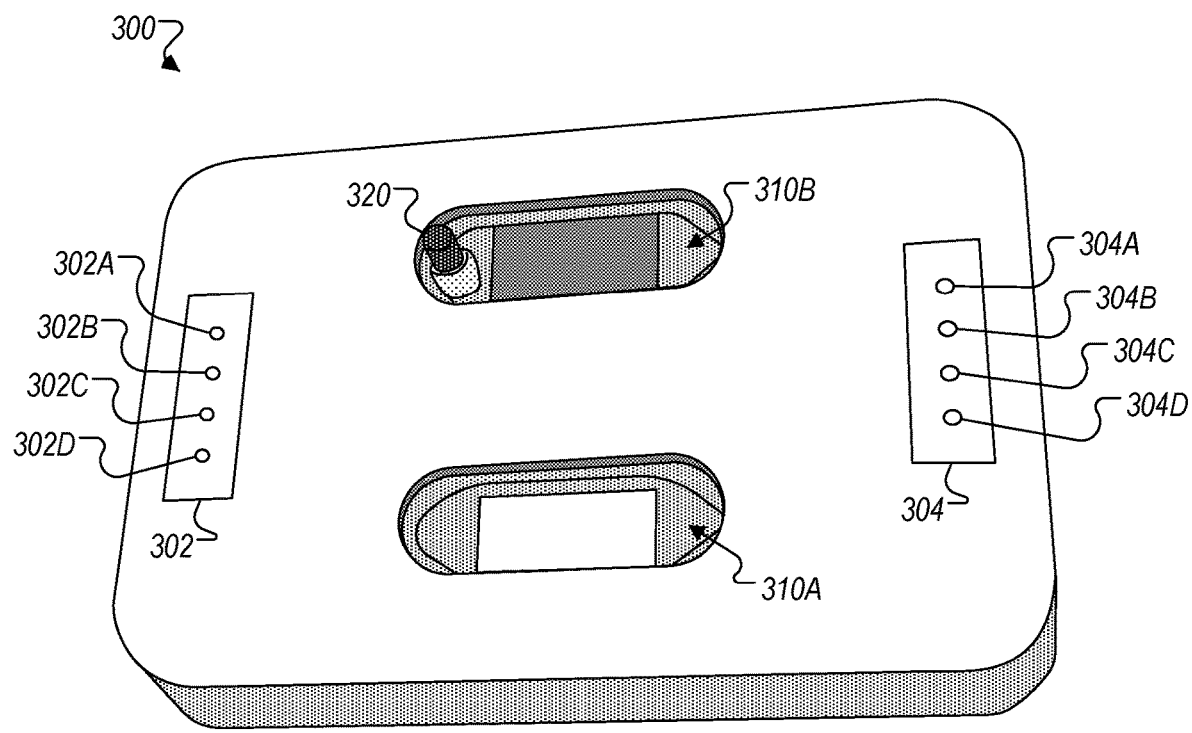
FIG. 3 is a schematic diagram of an example of a disposable test cartridge that includes both a purification chip, such as a porous chip, and an extraction chip, such as a microwell chip.

FIG. 3 is a schematic diagram of an example of a disposable integrated test cartridge 300 with both a porous chip 310A and a microwell chip 310B. The cartridge 300 includes an integrated fluidic circuit molded onto plastic parts. The porous chip 310A is placed upstream of the microwell chip 310B within the fluidic circuit such that a sample fluid introduced into the cartridge 300 initially flows through a fluidic chamber of the porous chip 310A and then through a fluidic chamber of the microwell chip 310B as described herein.

The cartridge 300 includes multiple inlet ports 302A, 302B, and 302C. Each inlet is used to introduce a different type of fluid into the fluidic circuit of the cartridge 300 for performing an assay as described herein. For example, inlet port 302A is used to introduce a sample fluid, e.g., whole blood, inlet port 302B is used to introduce a magnetic bead solution, and inlet port 302C is used to introduce assay reagent solutions, e.g., PBS, fluorescent dyes, etc.

The cartridge 300 also includes multiple outlet ports 304A, 304B, and 304C. Each outlet is used to remove a different type of fluid that exits the fluidic circuit of the cartridge 300. For example, outlet port 304A is used to remove waste that exits from the microwell chip 310B, outlet port 304B is used to remove waste that exits from a top chamber of the porous chip 310A, e.g., fluidic chamber 114 depicted in FIG. 1B, and outlet port 304C is used to remove waste that exits from a bottom chamber of the porous chip 310A, e.g., chamber 116 depicted in FIG. 1B.

The inlet ports and the outlet ports of the cartridge 300 are covered by covers 302 and 304, respectively, to provide an interface with other components of the assay system, such as tubing that connects to a sample chamber, a reagent reservoir, and a waste container as depicted in FIG. 1A. In some embodiments, the inlet ports and outlet ports of the cartridge 300 interface with a manifold rig on a lid that closes over the cartridge 300 to enable sample incubation inside the cartridge 300, i.e., incubation after introducing fluids into the cartridge 300. For example, a fluid sample can be incubated with a magnetic bead solution inside the cartridge device without requiring any external sample processing when performing the assay using the cartridge 300. In such embodiments, the cartridge can be placed on a stage that moves the cartridge to enhance sample mixing. For example, the stage can be moved along an axis to cause the cartridge to be rocked back and forth.

The cartridge 300 includes selector valves 302D and 304D to adjust the flow of fluid to and from the microwell chip 310B and the porous chip 310A, respectively. The selector valve 302D can be used to adjust the flow of fluid through the fluidic circuit upstream of the porous chip 310A for incubation of a fluid sample and magnetic bead solution for magnetization of target entities. The selector valve 304D can be used to control the flow of fluid through the fluidic circuit upstream of the microwell chip 310B. For example, the selector valve 304D can be used to permit the sample fluid in the top chamber of the porous chip 310A to exit and enter the fluidic chamber of the microwell chip 310B for capturing target entities in microwells as described herein.

A sliding door/cover and handle 320 covers the microwell chip 310B. Upon completion of the cell compartmentalization into specific, known locations in the extraction chip, sliding door 320 is opened, providing direct access to the cells (through about 1 mm deep buffer layer), e.g., using a micropipette or other cell extracting/picking mechanism. This sliding door can be opened manually or automatically, e.g., by configuring a scanning x-y and a motorized z-stages to work together to move the cartridge under a ledge, notch, or other mechanical mechanism, opening the door. In other embodiments, a separate mechanical system, e.g., a robotic arm, can be used to open the sliding door and handle 320. The extracted cells can then be placed into individual bins or wells, e.g., in a microwell plate, e.g., a 96-well microwell plate.

Reagent Cartridges

Figure 4B:
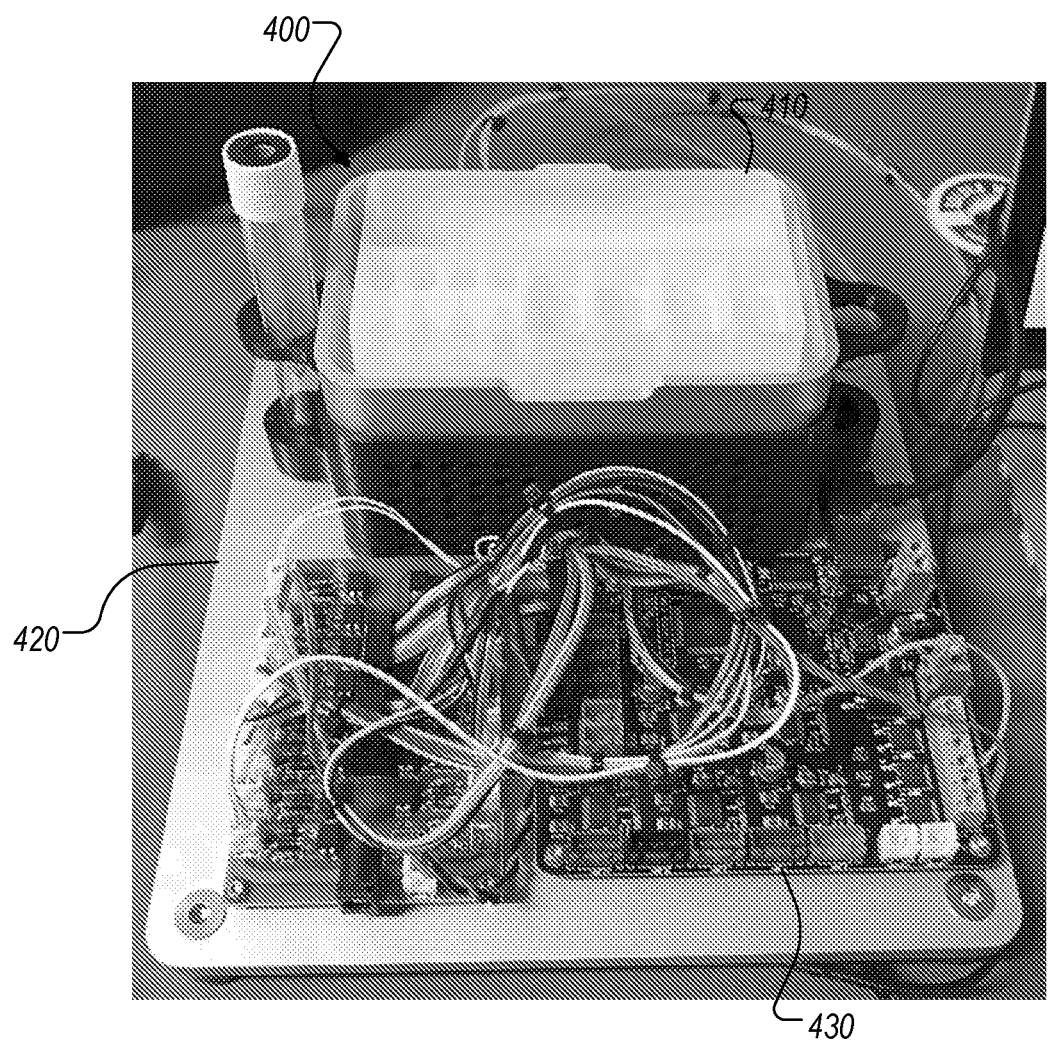

FIGS. 4A-B are schematic diagrams of an example of a reagent cartridge 400 that can be used with the system 100 depicted in FIG. 1A. FIG. 4A depicts examples of reservoirs in a substrate 402 for storing assay reagents. FIG. 4B shows an embodiment of the reagent cartridge 400 placed on a mating manifold 420 for use with a manual or a semi-automated assay system.

Reservoirs of the cartridge 400 can be appropriately sized to store the correct volumes of reagents that are to be used in different stages of an assay. Reservoir 410 can be used to store reagents such as PBS that are used for rinse and wash steps between incubations. Reservoirs 412, 414, 422, 424, 432, 434, 442, and 444 can be used to store fluorescent dyes, magnetic bead solutions, or other solutions that are used in small volumes when performing the assays. Reservoirs 452, 462, 472, and 482 can store washing solutions and diluents used to adjust the concentration of other solutions. In some embodiments, reservoir 410 is sized to store approximately up to 40 mL of liquid, reservoirs 412, 414, 422, 424, 432, 434, 442, and 444 are sized to store 0.5-2 mL of liquid, and reservoirs 452, 462, 472, and 482 are sized to store between 5-10 mL of liquid. In some implementations, reservoir 410 stores PBS, the reservoirs 412, 414, 422, 424, 432, 434, 442, and 444 store fluorescent dyes, fixing reagents, and 452, 462, 472, and 482 stores deionized water, Tween® rinse solution, BSA, or ethanol. Although FIG. 4A depicts one example of a reservoir configuration for the reservoir array, other configurations are contemplated within this disclosure. For example, the reservoirs can have different shapes, depths, and spacing based on the particular assay to be performed by the system 100.

In certain embodiments, the reagent cartridge 400 is used to perform an assay for CTCs for lung cancer in a blood sample. In such embodiments, the reagent cartridge 400 can store reagents such as a magnetic bead solution with beads coated with lung cancer-oriented capture antibodies, e.g., anti-EpCAM, anti-EGFR, and anti-PD-L1), deionized water, ethanol, BSA+Tween® wash buffer, RBS pF detergent, red blood cell lysis buffer, PBS buffer, paraformaldehyde (PFA), Triton®, and staining antibody solutions modified with fluorescent tags, e.g., Cytokeratin, CD45, and nuclear stains, e.g., Hoechst stain.

Reagent solutions can be stored in the reagent cartridge 400 in a manner that ensures that they function properly and meet a repeatable standard. For example, antibody-bead conjugates can be stored in a specified concentration range, e.g., 1-10 mg/mL, at 4° C. to maintain long-term performance. In some implementations, the reagent cartridge 400 is stored in a fridge, e.g., for up to 6 months, until before the assay workflow is initiated (at which point, it is inserted into a system, e.g., system 500. The system can provide cooling for reagents if need. For example, some of the reagents that need chilled storage, e.g., dyes, antibody solutions, etc., could be stored at high concentration/low volume (or even lyophilized) and then be reconstituted during the assay with PBS or water automatically.

In certain embodiments, antibody-bead conjugates can be stored in Good's buffers (PMID 5942950), supplemented with 50-200 mM NaCl, 0-50 mM KCl, and 0-10% glycerol. Azide (0.2%) can be included in the buffers to mitigate contamination. After coupling with antibodies, the beads are washed three times with a buffer and stored at 4° C. Bi-monthly aliquots can be taken and tested for specific activity and compared to a time zero control to ensure that stored buffers are not contaminated. The testing can be used to allow functionalized beads to retain greater than 90% specific activity over prolonged storage times in a sealed reagent cartridge. In some embodiments, the magnetic beads are Dynabead® MyONE® T1 beads (sized 1 μm) has a small enough size that it diffuses and mixes well during incubation in whole blood, yet is large enough to avoid non-specific aggregation.

Automated Assay Systems

FIG. 5 is a schematic diagram of an example of an automated assay system 500, e.g., a fully automated system. The system 500 can be configured to perform an assay to isolate, capture, and/or extract target entities from a fluid sample using the techniques described herein. The assay can be performed with minimal or no intervention by an operator, thereby reducing the ease-of-use in performing the assay. The system 500 can also be used to improve the repeatability of the assay by reducing the likelihood of errors due variability in manual sample processing.

The system 500 includes a display 510, a housing 520, and a compartment 530 within the housing 520. In some implementations, the system includes an incubation chamber in which the sample fluid, e.g., blood, and magnetic beads are mixed and warmed or cooled, as required for a specific sample fluid. Such an incubation chamber can be within the housing or outside the housing. If the incubation chamber is within the housing, the sample fluid can be flowed through a fluid conduit, e.g., plastic or rubber tube, from the sample fluid container (e.g., test tube, vial, or vacutainer) into a sample fluid reservoir within the incubation chamber in the housing, where the magnetic beads can be added and mixed by gentle motion and the sample fluid can be heated or cooled as needed.

The compartment 530 encloses components that are used to perform an automated assay to isolate, capture, and/or extract target entities from a fluid sample. For example, the compartment 530 encloses a test cartridge 532, a reagent cartridge 534, a sample tube 536, a tube rack 538, an imaging objective 542, and a collection device 544. The test cartridge 532 is placed on top of a translation stage 546 that houses one or more magnets and other electronic components for adjusting the placement of the test cartridge 532 relative to an objective 542 used for imaging and analysis. The reagent cartridge 534 is sealed or covered by a cartridge lid 548. In some embodiments, the test cartridge 532 is the cartridge 300 depicted in FIG. 3, and the reagent cartridge 534 is the cartridge 400 depicted in FIGS. 4A and 4B.

The system 500 includes an imaging microscope (not shown in FIG. 5) for capturing images of target entities isolated and/or captured using the test cartridge 532. The microscope collects images of the fluidic chamber of the test cartridge 532 through the objective 542. The microscope can be operated automatically by a computing device without significant human intervention. In some embodiments, the microscope is a custom-built imaging device using original equipment manufacturer (OEM) microscopy components. In such embodiments, the computing device can run software that integrates a microscopy manufacturer's software development kit (SDK) with custom code that provides control of the translation stage 546 during the assay operation. For example, the custom code can be developed on MATLAB®, or alternatively, coded in a suitable objective-oriented programming language, such as C/C#.

The test cartridge 532 is placed over the translation stage 546 and can be secured in place with a variety of mechanical fasteners, such as simple ball detents and/or latch doors over the cartridge housing. Precise positioning during cartridge loading is not necessary although positional registration of the test cartridge 532 can be achieved during and following the scanning of the microwell chip in the test cartridge 532 for cell enumeration. At this step, a real "x" and "y" position of several wells with known relative positions within the microwell chip can be determined from the images obtained during the scan by the microscope, leading to positional calibration. The placement of the reagent cartridge 534 can be achieved in a similar manner. For example, reservoirs of the reagent cartridge 534 can lie above a punch-through silicone layer, which is used to prevent any leakage.

The test cartridge 532 has fluidic inlets for receiving a sample fluid from the holder 552, and a magnet bead solution and reagent solutions from the reagent cartridge 534. The test cartridge 532 also includes a pneumatic input (not shown) to actuate selectors to direct flow, as well as outlets from the microwell chip and the porous chip, as well as another pneumatic access (not shown) to control flow from porous chip 112A to microwell chip 112B as described herein. Separate vacuum channels (not shown) pull selected reagents through the system from the reagent cartridge 534. For example, a small diaphragm pump (not shown) that is capable of producing both vacuum and pneumatic pressure is used to extract reagents from the reagent cartridge 534.

The system 500 incorporates a computer-controlled valve matrix (not shown) and a pump, such as the fluid control device 130 depicted in FIG. 1A. The valve matrix can be composed of small, fluidic valves (the Lee Company, Essex, Conn.) that connect downstream of each reagent reservoir in the reagent cartridge 534. The fluid control valves can be pneumatic valves upstream of the reservoirs within the reagent cartridge 534.

As described herein, the sample fluid can be incubated with a magnetic bead solution inside the test cartridge 532. To enhance mixing, the translation stage 546 can be programmed to move, e.g., horizontally in an oscillatory manner during incubation. Magnets, e.g., electromagnets or permanent magnets, within the housing of the test cartridge 532 can be constructed of low-loss, high-frequency ferrite cores with negligible hysteresis. Copper windings of the magnets can be cooled, for example, by immersing them within Peltier cooling blocks. This construction enables a compact electromagnet assembly geometry capable of generating the large magnetic forces needed to replace permanent magnets currently in use.

The collection device 544 is used to extract target entities that are captured in microwells of the microwell chip as described herein. In some embodiments, the collection device 544 is a micropipette connected to a pump, e.g., a high precision piston pump, for example, a piston pump capable of over 5 million cycles without failure. The piston pump can pull and push cells through the micropipette tip in small volumes of liquid, e.g., sub-microliter volumes. The piston pump can be connected to a three-way valve to enable a cleaning reagent to be pushed through the tip and for automatic rinsing. The micropipette tip can be attached to a vertical miniature linear actuator that can lower the micropipette to a precise height for cell extraction. In some embodiments, the x-y coordinate of the micropipette tip is fixed as an absolute frame of reference, and a translation stage 546 can be moved to adjust the positioning of the test cartridge 532 relative to the positioning of the fixed micropipette tip. Target entities collected through the micropipette can be introduced into a tube placed on the tube rack 538 for downstream analysis, e.g., PCR.

During a typical assay operation, an operator initially attaches the sample tube 536 to a holder 552. The holder 552 is attached to a pneumatic tube system that is used to transport a fluid sample in the sample tube 536 through tubing and into a fluidic circuit of the test cartridge 532. The operator accesses an interface presented on the display 510 to specify, for example, the type of assay to be performed, the target entities to be analyzed by the system 100, and/or the number of target entities to extract from the sample fluid. In some embodiments, where the system 500 is capable of performing different types of assays for different target entities, the operator can use the interface to select an operation to perform a particular assay from among the different types of assays. The received user selection is then used to configure a computing device of the system 500 to specify assay parameters as described herein.

Figure 6:
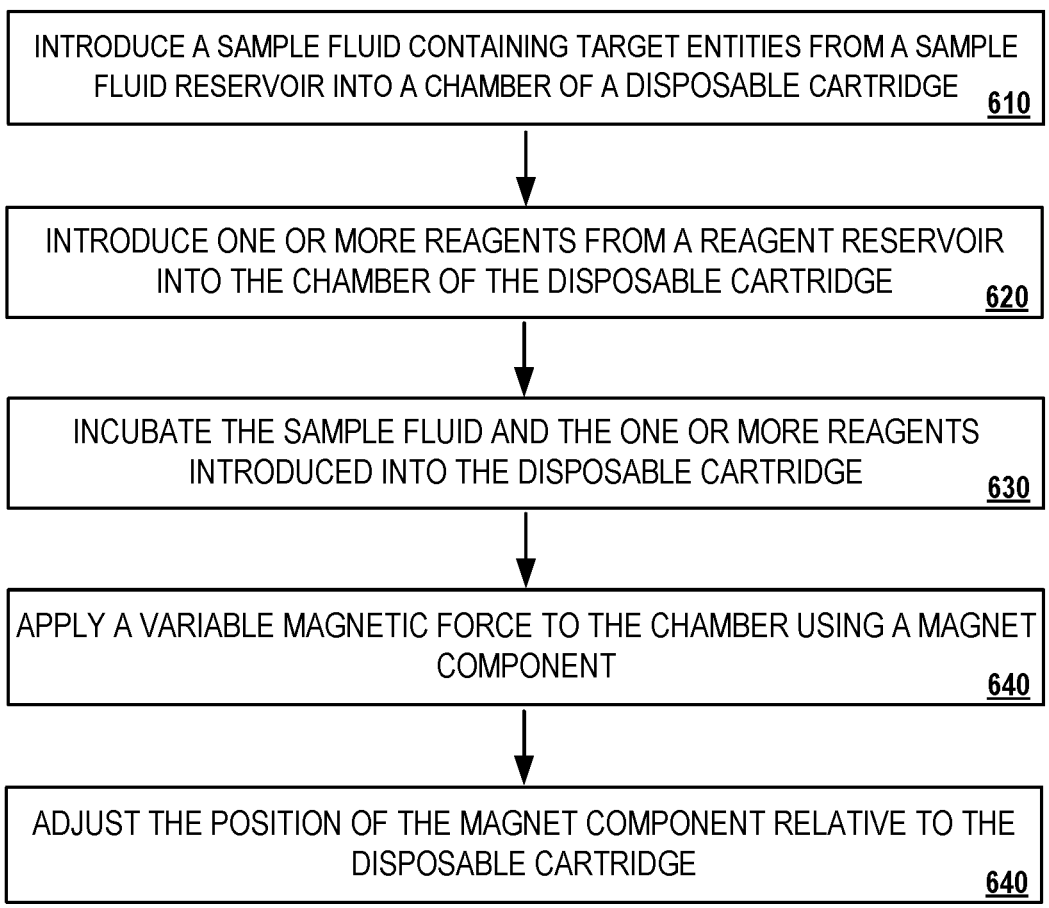
FIG. 6 is a flow chart for an example of a process for capturing cells using a cell analysis system described herein.

FIG. 6 is a flow chart for an example of a process 600 for capturing cells using the systems described herein. Briefly, the process 600 can include the operations of introducing a sample fluid containing target entities from a fluid reservoir into a chamber of a disposable cartridge (610), introducing one or more reagents from a reagent reservoir into the chamber of the disposable cartridge (620), incubating the sample fluid and the one or more reagents introduced into the cartridge (630), applying a variable magnetic force to the chamber using a magnet component adjustably arranged underneath the cartridge (640), causing the sample fluid to pass over a porous surface of the cartridge (650), and adjusting a position, field strength, or both of the magnet component relative to the cartridge (660).

In more detail, the process 600 can include the operations of introducing a sample fluid containing target entities from a fluid reservoir into a chamber of a disposable cartridge (610). For example, as shown in FIG. 1A, a sample fluid containing target entities can be introduced from the sample tube 132 into a chamber of the microfluidic device 110 using the fluid control device 130. The chamber can be the fluidic chamber 114 of the porous chip 112A (shown in FIG. 1B) or the microfluidic chamber 124 of the microwell chip 112B (shown in FIG. 1C).

The process 600 can include introducing one or more reagents from a reagent reservoir into the chamber of the disposable cartridge (620). For example, as shown in FIG. 1A, one or more reagents can be introduced from reagent reservoirs of the reagent cartridge 134 into a chamber of the microfluidic device 110 using the fluid control device 130. The chamber can be the microfluidic chamber 124 of the microwell chip 112B (shown in FIG. 1C).

The process 600 can include incubating the sample fluid and the one or more reagents introduced into the cartridge (630). For example, as discussed herein, once the sample fluid and the reagents have been introduced into the microfluidic device 110, the mixture can be incubated for a time period as specified by the type of assay being performed using the microfluidic device 110.

The process 600 can include applying a variable magnetic force to the chamber using a magnet component adjustably arranged underneath the cartridge (640). For example, as shown in FIG. 1A, a variable magnetic force can be applied underneath the microfluidic device 110 using the magnet component 144 that is adjustably arranged underneath he microfluidic device 110.

The process 600 can include causing the sample fluid to pass over a porous surface of the cartridge (650). For example, as shown in FIG. 1A, the fluid control device 130 can be used to introduce flow fluid through a fluidic circuit of the microfluidic device 110 and cause the sample fluid to pass over the porous surface 118 of the porous chip 112A. As shown in FIG. 1B, the flow rate applied by the fluid control device 130 can be sufficient to move non-magnetic entities, e.g., non-target entities 104 over and away from the porous surface 118, but not sufficient to remove magnetic target entities, e.g., target entities 102, away from the porous surface 118 where they are held on pores 118A by the variable magnetic force.

The process 600 can include adjusting a position, field strength, or both of the magnet component relative to the cartridge (660). For example, as described herein, the variable magnetic force applied by the magnet component 144 can be adjusted by adjusting the position of the magnet component 144 relative to the microfluidic device 110, by increasing or decreasing the field strength of the magnet component 144, or both.

EXAMPLES

The invention is further described in the following examples, which do not limit the scope of the invention described in the claims.

Example 1—Spiked Cell Assays

Experiments are conducted with the system 100 to evaluate performance in capturing and isolating target entities from blood samples that were spiked with known amounts of target entities. In general, spiking experiments are done with a known number of cells spiked into a known volume of a fluid to produce a sample fluid, e.g., an 8 mL blood sample, and purified, captured, and extracted in the microfluidic device 110.

A stock suspension of cells is prepared and a small fraction of the suspension that extrapolates to a certain number of cells is then injected into the blood sample. For example, choriocarcinoma cells (JEG3) are obtained from ATCC and cultured. Known numbers of cells are spiked into blood samples by either deterministically aspirating them one by one (e.g., 6 cells) or using a small volume of a stock suspension containing a large number of cells. A cocktail of antibody-coated magnetic beads is prepared by functionalizing a group of beads with EpCAM antibodies and another group with HLA-G antibodies. The antibodies can be purchased as already biotinylated and are coupled to streptavidin-coated beads. Upon capturing the cells, they are stained with fluorescent-tagged EpCAM and HLA-G antibodies to verify that the cells indeed have these antigens on their surfaces. The cells are also stained with Hoechst to verify nuclear DNA.

In the case of 6 cells, each cell is individually injected into the blood sample. The blood sample is then incubated with antibody-coated beads, flowed through the porous chip for initial isolation, and are then introduced into the microwell chip for single cell compartmentalization as described herein.

In general, due to the low number of the targeted cells, the intermediate purity on the porous chip, i.e., the ratio of the detected cell to the total number of cells (detected and WBC) on the porous chip, is normally low. This is why the cells are then transferred onto the well chip and separated into individual wells, which allows the system or the user to pick and extract (e.g., via micropipetting) an individual cell without touching any other cell, resulting in an "ultimate purity" of 100%.

Although in this example model cells are evaluated via spiking, the systems and techniques described herein can be used to detect many types of rare cells in a wide variety of samples. For example, other experiments can be conducted to detect CTCs with samples obtained from patients with pancreatic cancers, bladder cancers, prostate cancers, and renal cancers, as well as fetal trophoblasts from blood samples of pregnant women.

In some implementations, the target entity capture and isolation techniques described herein can be employed using commercially available antibodies with standard antibody affinity and specificity. In other implementations, system-specific antibodies, e.g., non-commercially available antibodies, can be developed to provide fine-tuned control over antibody affinity and specificity to improve reliability when used with the particle capture systems described herein and to reduce variation in performance of performing assay operations.

The system-specific antibodies can also be designed to bind specifically with three antigens that are overexpressed on the surfaces of lung cancer CTCs, e.g., EpCAM, EGFR, and PD-L1. An antibody cocktail may be used capture a variety of CTCs. For example, the cocktail may be used to capture CTCs that are epithelial (EpCAM), CTCs that have gone through epithelial to mesenchymal transition (EGFR), and CTCs that represent tumor tissue that is prone to being targeted by monoclonal-antibody based drugs such as atezolizumab.

Example 2—CTC Count from Blood Samples of NSCLC Patients

The particle capture systems described herein are used to isolate, capture, and/or analyze CTCs from blood samples of patients with non-small cell lung cancer (NSCLC). Experiments are performed with samples from patients diagnosed with Stage IV NSCLC. Some of the patients may have received cancer therapy. A cocktail of EpCAM, EGFR, and Vimentin antibodies is used to functionalize magnetic beads. The functionalized magnetic beads were incubated with each collected blood sample.

Streptavidin coated beads with 1 micrometer diameter can be obtained from Sigma Aldrich and coupled with biotinylated antibodies obtained from Abcam (EGFR, Vimentin) and R&D (EpCAM) Systems. The beads are incubated with a 8 mL blood sample diluted to 16 mL over a period of 35 to 60 minutes under a rocking or rotating condition. The mixture was then run through a porous chip at a fluidic flow rate of 2 mL/min. A wash is performed with PBS as well as a red blood cell lysis buffer to remove any remaining red blood cells.

Figure 7A:
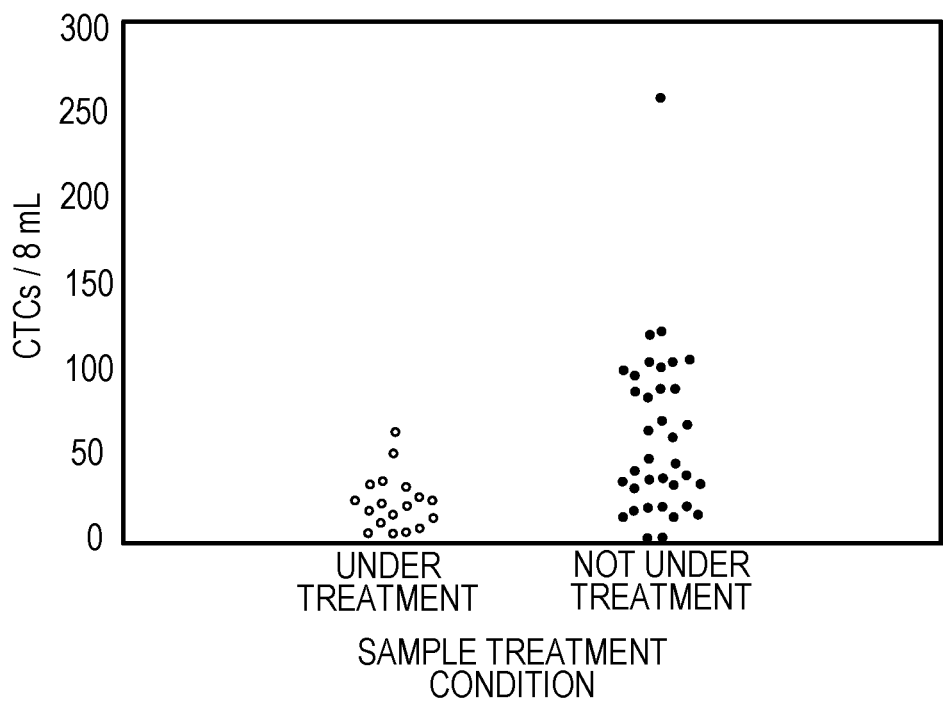
FIG. 7A is a graph that illustrates potential results in which the systems described herein are used to isolate, capture, and/or analyze circulating tumor cells (CTCs) from blood samples of patients with non-small cell lung cancer (NSCLC).

FIG. 7A shows potential results from such experiments. Results would show that one or more CTCs are identified in some of the patient samples. Higher numbers of CTCs are typically observed in patient samples from patients that have not received cancer treatment, indicating that CTC count has a correlation with overall tumor burden.

Figure 7B:
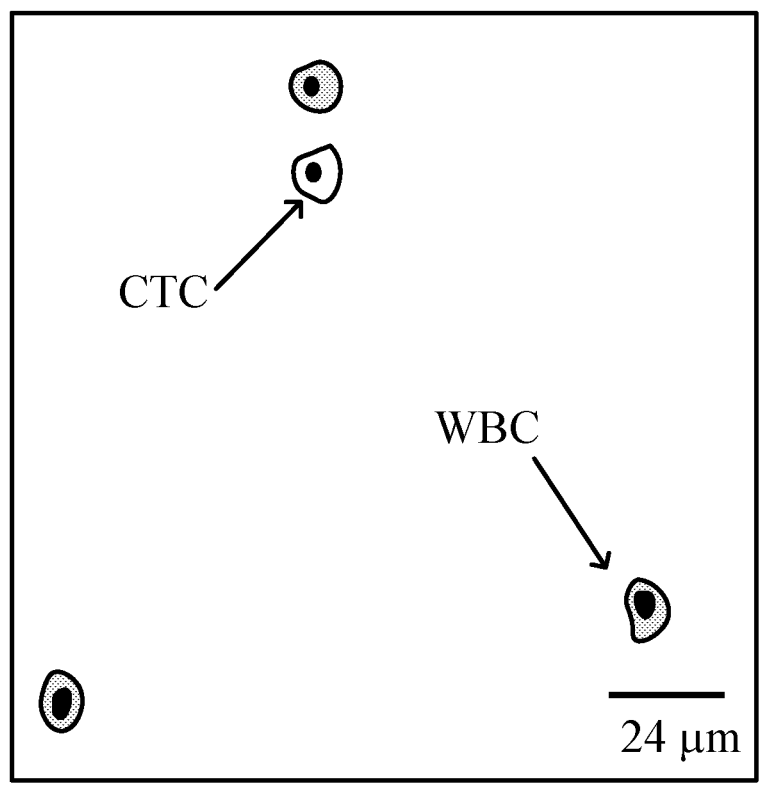
FIG. 7B is a representation of a potential fluorescent image of a patient sample with an identified CTC.

FIG. 7B shows a potential fluorescent image of a patient blood sample with a CTC. The blood sample is stained with cytokeratin_CK for fluorescent identification of CTCs. CD45+ white blood cells are used as a negative control for CTC identification. A high flow rate is employed to wash away almost all of the unwanted cells such that only a few hundred WBCs (out of 100s of millions) are captured on the porous chip during the initial isolation. The sample is subsequently introduced into a microwell chip to isolate each cell into a separate compartment allowing extraction of only the desired single cells. This technique increases the purity of the CTCs to approximately 100%.

Other Embodiments

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A system for performing an assay of target entities having a nominal diameter and that are magnetic, or are made to be magnetic by being bound to magnetic beads, the system comprising:
   a housing comprising:
      a receiving area sized and configured to support a test cartridge device for capturing target entities when a sample fluid containing target entities is flowed through the test cartridge device, wherein the test cartridge device comprises one or more microfluidic chips;
      a sample fluid reservoir in fluid communication with the receiving area and configured to store the sample fluid;
      one or more reagent reservoirs, each in fluid communication with the receiving area and configured to store one or more reagents;
      one or more magnet components arranged adjacent to the receiving area and configured to generate a magnetic force within a test cartridge sufficient to separate magnetic target entities from non-magnetic entities and to hold at least one magnetic target entity in at least one known location within at least one of the microfluidic chips when fluid flows across a surface within the microfluidic chip;
      a fluid control device comprising a pump or fluid pressure controller for controlling flow of the sample fluid and the one or more reagents through the one or more microfluidic chips, with a flow meter and one or more valves, wherein the fluid control device causes the sample fluid to pass through the one or more microfluidic chips at a flow rate sufficient to move non-magnetic entities out of the one or more microfluidic chips, but not sufficient to remove magnetic target entities from the one or more microfluidic chips;
      a target entity collection device comprising one or more micropipettes for extracting target entities from the at least one known location within the at least one of the microfluidic chips; and
      a computing device arranged and programmed to control at least the fluid control device.

2. The system of claim 1, further comprising the test cartridge device, wherein the test cartridge device comprises a purification chip that comprises a porous surface, wherein pores of the porous surface are smaller than the nominal diameter of the target entities, and wherein the magnetic force is selected or controlled by the computing device to attract and move magnetic target entities toward the porous surface and to hold at least one magnetic target entity on the porous surface when the sample fluid flows across the porous surface and to attract magnetic beads that are not bound to a target entity to pass through the pores.

3. The system of claim 2, wherein the test cartridge device further comprises an extraction chip that comprises a microwell surface comprising a plurality of microwells arranged in one or more arrays of the microwell surface, wherein the microwells are larger than the nominal diameter of the target entities, and wherein the magnetic force is selected or controlled by the computing device to attract and to hold at least one magnetic target entity in at least one of the plurality of microwells when the sample fluid flows across the microwell surface.

4. The system of claim 1, wherein the one or more valves are controlled for selecting either to:
   flow the fluid sample stored in the sample fluid reservoir into the test cartridge, or
   flow the one or more reagent fluids stored in the reagent reservoir into the test cartridge.

5. The system of claim 1, further comprising a set of magnetic beads configured to bind specifically to the target entities.

6. The system of claim 5, wherein the target entities are a specific type of cell, and the magnetic beads are functionalized to bind specifically to the specific type of cell.

7. The system of claim 5, wherein the magnetic beads comprise on their surfaces one or more binding moieties that specifically bind to a molecule on the surface of the target entities.

8. The system of claim 2, wherein pores of the porous surface have a size of between 0.5 μm and 20 μm.

9. The system of claim 3, wherein microwells in the plurality of microwells each have a size larger than the nominal diameter of the target entities and smaller than two times the nominal diameter, wherein only one target entity can fit into an individual microwell, and each microwell in the plurality of microwells has approximately the same size.

10. The system of claim 3, wherein the one or more arrays of the microwell surface comprise:
   a first array of microwells arranged at a first location on the microwell surface; and
   second and subsequent arrays, if present, arranged sequentially on the microwell surface at second and subsequent locations, such that sample fluid first flows across the first array of microwells and then flows sequentially across the second and subsequent arrays of microwells, and wherein microwells in the second and subsequent arrays, if present, each have a size, within a given array, that is at least 10 percent larger than the size of the microwells in the previously adjacent array.

11. The system of claim 6, wherein the magnetic beads are functionalized to bind specifically to circulating tumor cells, fetal cells, or nucleated red blood cells.

12. The system of claim 8, wherein pores of the porous surface have a size of between 5 μm and 15 μm.

13. The system of claim 1, further comprising an analyzer device for imaging the at least one magnetic target entity in at least one known location within the microfluidic chip.

14. The system of claim 1, wherein the target entity extraction device further comprises a micromanipulator that interacts with the one or more micropipettes and a pump connected to one or more of the one or more micropipettes to push or pull target entities through a tip of the one or more micropipettes.

15. The system of claim 14, wherein the one or more micropipettes and the pump are controlled by the computing device to automatically push or pull target entities through tips of the one or more micropipettes.

16. The system of claim 1, wherein the one or more micropipettes are arranged for operation by a human operator.

17. The system of claim 1, wherein the one or more magnets comprise permanent magnets.

18. The system of claim 1, wherein the one or more magnets comprise electromagnets.

19. The system of claim 1, further comprising the test cartridge device, wherein the test cartridge device comprises
a body comprising at least one body inlet and at least one body outlet;
a first microfluidic component arranged within the body and comprising a chamber having a first inlet in fluid communication with the body inlet, and a first outlet; and a plate disposed within the chamber and separating the chamber into a first portion and a second portion, wherein the plate comprises a plurality of pores, wherein each pore is smaller than the nominal diameter of the target entities and larger than the magnetic beads;
a second microfluidic component arranged within the body and comprising a second chamber having a second inlet and a second outlet, wherein the second chamber comprises a microwell surface having a plurality of microwells arranged in one or more arrays on the microwell surface, wherein the microwells are larger than the nominal diameter of the target entities; and
a valve arranged within the body and configured to provide selective fluid communication with the first outlet, the body outlet, and the second inlet;
wherein the first and second microfluidic components are arranged in series and the valve is arranged between the first and second chambers, and wherein the valve provides selective fluid communication from the first outlet to either the body outlet or the second inlet.

20. The system of claim 19, wherein microwells in the plurality of microwells each have a size that permits entry of only one target entity per microwell, and each microwell in the plurality of microwells has approximately the same size.

21. The system of claim 19, wherein the one or more arrays of the microwell surface comprise:
a first array of microwells arranged at a first location on the microwell surface; and
a second array, and any subsequent arrays, of microwells arranged sequentially on the microwell surface at second and subsequent locations, such that sample fluid first flows across the first array of microwells and then flows sequentially across the second array, and any subsequent arrays, of microwells, and wherein microwells in the second and any subsequent arrays each have a size, within a given array, that is at least 10 percent larger than the size of the microwells in the previously adjacent array.

\* \* \* \* \*